(12) United States Patent
Chen et al.

(10) Patent No.: US 12,407,065 B2
(45) Date of Patent: Sep. 2, 2025

(54) ELECTROCHEMICAL CELLS WITH MULTIPLE SEPARATORS, AND METHODS OF PRODUCING THE SAME

(71) Applicant: 24M Technologies, Inc., Cambridge, MA (US)

(72) Inventors: Junzheng Chen, Concord, MA (US); Naoki Ota, Lexington, MA (US); Jeffry Disko, Lexington, MA (US); Anthony D'Angelo, Medford, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 18/777,397

(22) Filed: Jul. 18, 2024

(65) Prior Publication Data

US 2024/0372213 A1    Nov. 7, 2024

Related U.S. Application Data

(63) Continuation of application No. 17/733,658, filed on Apr. 29, 2022.

(Continued)

(51) Int. Cl.
*H01M 50/414* (2021.01)
*H01M 4/131* (2010.01)
(Continued)

(52) U.S. Cl.
CPC ......... *H01M 50/414* (2021.01); *H01M 4/131* (2013.01); *H01M 4/136* (2013.01);
(Continued)

(58) Field of Classification Search
None
See application file for complete search history.

(56) References Cited

U.S. PATENT DOCUMENTS 3,625,771 A    12/1971    Arrance et al.
3,647,554 A    3/1972    Arrance et al.
(Continued)

FOREIGN PATENT DOCUMENTS

CA    2605874 A1    1/2007
CA    2886154 A1    4/2014
(Continued)

OTHER PUBLICATIONS

Holtmann et al., "Boehmite-based ceramic separator for lithium-ion batteries," Journal of Applied Electrochemistry, Jan. 2016, 46, pp. 69-76, https://doi.org/10.1007/s10800-015-0895-z.
(Continued)

*Primary Examiner* — Stephan J Essex
(74) *Attorney, Agent, or Firm* — Cooley LLP

(57) ABSTRACT

Embodiments described herein relate to electrochemical cells with multiple separators, and methods of producing the same. A method of producing an electrochemical cell can include disposing an anode material onto an anode current collector, disposing a first separator on the anode material, disposing a cathode material onto a cathode current collector, disposing a second separator onto the cathode material, and disposing the first separator on the second separator to form the electrochemical cell. The anode material and/or the cathode material can be a semi-solid electrode material including an active material, a conductive material, and a volume of liquid electrolyte. In some embodiments, less than about 10% by volume of the liquid electrolyte evaporates during the forming of the electrochemical cell. In some embodiments, the method can further include wetting the first separator and/or the second separator with an electrolyte solution prior to coupling the first separator to the second separator.

30 Claims, 13 Drawing Sheets

Related U.S. Application Data

(60) Provisional application No. 63/181,721, filed on Apr. 29, 2021.

(51) Int. Cl.
*H01M 4/136* (2010.01)
*H01M 4/1391* (2010.01)
*H01M 4/1397* (2010.01)
*H01M 10/0562* (2010.01)
*H01M 50/403* (2021.01)
*H01M 50/46* (2021.01)
*H01M 50/491* (2021.01)

(52) U.S. Cl.
CPC ....... *H01M 4/1391* (2013.01); *H01M 4/1397* (2013.01); *H01M 10/0562* (2013.01); *H01M 50/403* (2021.01); *H01M 50/46* (2021.01); *H01M 50/491* (2021.01); *H01M 2300/0051* (2013.01)

(56) References Cited

U.S. PATENT DOCUMENTS

| | | |
|---|---|---|
| 3,703,413 A | 11/1972 | Arrance |
| 4,338,177 A | 7/1982 | Withers et al. |
| 4,342,637 A | 8/1982 | Withers et al. |
| 4,670,110 A | 6/1987 | Withers et al. |
| 4,711,719 A | 12/1987 | Leenaars et al. |
| 4,826,743 A | 5/1989 | Nazri |
| 4,916,033 A | 4/1990 | Gourdine |
| 5,162,175 A | 11/1992 | Visco et al. |
| 5,194,341 A | 3/1993 | Bagley et al. |
| 5,314,765 A | 5/1994 | Bates |
| 5,326,391 A | 7/1994 | Anderson et al. |
| 5,340,669 A | 8/1994 | Chaloner-Gill et al. |
| 5,350,645 A | 9/1994 | Lake et al. |
| 5,415,954 A | 5/1995 | Gauthier et al. |
| 5,418,091 A | 5/1995 | Gozdz et al. |
| 5,439,760 A | 8/1995 | Howard et al. |
| 5,549,717 A | 8/1996 | Takeuchi et al. |
| 5,569,520 A | 10/1996 | Bates |
| 5,597,659 A | 1/1997 | Morigaki et al. |
| 5,691,005 A | 11/1997 | Morigaki et al. |
| 5,731,104 A | 3/1998 | Ventura et al. |
| 5,778,515 A | 7/1998 | Menon |
| 5,824,434 A | 10/1998 | Kawakami et al. |
| 5,840,087 A | 11/1998 | Gozdz et al. |
| 5,882,721 A | 3/1999 | Delnick |
| 5,888,431 A | 3/1999 | Tonar et al. |
| 5,894,656 A | 4/1999 | Menon et al. |
| 5,948,464 A | 9/1999 | Delnick |
| 5,983,488 A | 11/1999 | Erickson et al. |
| 6,148,503 A | 11/2000 | Delnick et al. |
| 6,153,337 A | 11/2000 | Carlson et al. |
| 6,156,190 A | 12/2000 | Xia et al. |
| 6,162,563 A | 12/2000 | Miura et al. |
| 6,172,795 B1 | 1/2001 | Carlson |
| 6,183,901 B1 | 2/2001 | Ying et al. |
| 6,190,426 B1 | 2/2001 | Thibault et al. |
| 6,194,098 B1 | 2/2001 | Ying et al. |
| 6,210,831 B1 | 4/2001 | Gorkovenko et al. |
| 6,224,846 B1 | 5/2001 | Hurlburt et al. |
| 6,268,087 B1 | 7/2001 | Kim et al. |
| 6,277,514 B1 | 8/2001 | Ying et al. |
| 6,277,981 B1 | 8/2001 | Tu et al. |
| 6,287,720 B1 | 9/2001 | Yamashita et al. |
| 6,306,545 B1 | 10/2001 | Carlson et al. |
| 6,328,770 B1 | 12/2001 | Gozdz |
| 6,344,293 B1 | 2/2002 | Geronov |
| 6,358,397 B1 | 3/2002 | Lyublinski |
| 6,387,564 B1 | 5/2002 | Yamashita et al. |
| 6,406,814 B1 | 6/2002 | Gorkovenko et al. |
| 6,410,182 B1 | 6/2002 | Ying et al. |
| 6,423,444 B1 | 7/2002 | Ying et al. |
| 6,423,447 B1 | 7/2002 | Ohsaki et al. |
| 6,432,586 B1 | 8/2002 | Zhang |
| 6,436,583 B1 | 8/2002 | Mikhaylik |
| 6,444,344 B1 | 9/2002 | Saito et al. |
| 6,451,484 B1 | 9/2002 | Han et al. |
| 6,488,721 B1 | 12/2002 | Carlson |
| 6,495,292 B1 | 12/2002 | Yen |
| 6,497,780 B1 | 12/2002 | Carlson |
| 6,589,692 B2 | 7/2003 | Takami |
| 6,679,926 B1 | 1/2004 | Kajiura et al. |
| 6,682,856 B1 | 1/2004 | Watanabe et al. |
| 6,723,467 B2 | 4/2004 | Yoshida et al. |
| 6,724,512 B2 | 4/2004 | Carlson et al. |
| 6,811,928 B2 | 11/2004 | Aihara et al. |
| 6,846,435 B1 | 1/2005 | Bohnen et al. |
| 6,883,347 B2 | 4/2005 | Ayub |
| 6,946,218 B2 | 9/2005 | Crouch, Jr. et al. |
| 6,962,182 B2 | 11/2005 | Cordonnier et al. |
| 6,991,874 B1 | 1/2006 | Möhwald et al. |
| 7,014,948 B2 | 3/2006 | Lee et al. |
| 7,029,796 B2 | 4/2006 | Choi et al. |
| 7,066,971 B1 | 6/2006 | Carlson |
| 7,070,632 B1 | 7/2006 | Visco et al. |
| 7,081,142 B1 | 7/2006 | Carlson |
| 7,115,339 B2 | 10/2006 | Nakajima et al. |
| 7,135,250 B2 | 11/2006 | Sasaki et al. |
| 7,160,603 B2 | 1/2007 | Carlson |
| 7,378,185 B2 | 5/2008 | Fujikawa et al. |
| 7,396,612 B2 | 7/2008 | Ohata et al. |
| 7,402,184 B2 | 7/2008 | Ikuta et al. |
| 7,419,743 B2 | 9/2008 | Fujikawa et al. |
| 7,422,825 B2 | 9/2008 | Inoue et al. |
| 7,470,488 B2 | 12/2008 | Lee et al. |
| 7,560,193 B2 | 7/2009 | Ikuta et al. |
| 7,575,606 B2 | 8/2009 | Fukumoto et al. |
| 7,595,130 B2 | 9/2009 | Kawabata et al. |
| 7,638,230 B2 | 12/2009 | Fujita et al. |
| 7,638,241 B2 | 12/2009 | Lee et al. |
| 7,662,517 B2 | 2/2010 | Lee et al. |
| 7,674,559 B2 | 3/2010 | Min et al. |
| 7,682,740 B2 | 3/2010 | Yong et al. |
| 7,682,751 B2 | 3/2010 | Kato et al. |
| 7,687,202 B2 | 3/2010 | Nishino et al. |
| 7,695,870 B2 | 4/2010 | Park et al. |
| 7,704,641 B2 | 4/2010 | Yong et al. |
| 7,709,140 B2 | 5/2010 | Hennige et al. |
| 7,709,152 B2 | 5/2010 | Kim et al. |
| 7,709,153 B2 | 5/2010 | Lee et al. |
| 7,745,042 B2 | 6/2010 | Fujino et al. |
| 7,745,050 B2 | 6/2010 | Kajita et al. |
| 7,754,375 B2 | 7/2010 | Fujikawa et al. |
| 7,754,377 B2 | 7/2010 | Ohata et al. |
| 7,758,998 B2 | 7/2010 | Ohata et al. |
| 7,759,004 B2 | 7/2010 | Ikuta et al. |
| 7,811,700 B2 | 10/2010 | Hennige et al. |
| 7,816,038 B2 | 10/2010 | Ohata et al. |
| 7,829,242 B2 | 11/2010 | Hörpel et al. |
| 7,981,548 B2 | 7/2011 | Mimura |
| 8,076,027 B2 | 12/2011 | Honda et al. |
| 8,277,981 B2 | 10/2012 | Kim et al. |
| 8,574,743 B2 | 11/2013 | Kim et al. |
| 8,722,226 B2 | 5/2014 | Chiang et al. |
| 8,722,227 B2 | 5/2014 | Chiang et al. |
| 8,778,552 B2 | 7/2014 | Chiang et al. |
| 8,883,347 B2 | 11/2014 | Baba et al. |
| 8,993,159 B2 | 3/2015 | Chiang et al. |
| 9,070,954 B2 | 6/2015 | Carlson et al. |
| 9,153,833 B2 | 10/2015 | Chiang et al. |
| 9,178,200 B2 | 11/2015 | Bazzarella et al. |
| 9,180,412 B2 | 11/2015 | Jo et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,350,009 B1 | 5/2016 | Lim et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |

(56) References Cited

U.S. PATENT DOCUMENTS

| | | |
|---|---|---|
| 9,509,176 B2 | 11/2016 | Carter et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,069,888 B2 | 7/2021 | Liu et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 11,309,531 B2 | 4/2022 | Slocum et al. |
| 11,316,156 B2 | 4/2022 | Woo et al. |
| 11,342,567 B2 | 5/2022 | Chiang et al. |
| 11,394,023 B2 | 7/2022 | Ofer et al. |
| 11,394,049 B2 | 7/2022 | Tan et al. |
| 11,462,722 B2 | 10/2022 | Aranami et al. |
| 11,469,065 B2 | 10/2022 | Lawrence et al. |
| 11,476,551 B2 | 10/2022 | Tyler et al. |
| 11,552,368 B2 | 1/2023 | Holman et al. |
| 11,575,146 B2 | 2/2023 | Taylor et al. |
| 11,594,793 B2 | 2/2023 | Bazzarella et al. |
| 11,611,061 B2 | 3/2023 | Zagars et al. |
| 11,631,920 B2 | 4/2023 | Bazzarella et al. |
| 11,646,437 B2 | 5/2023 | Bazzarella et al. |
| 11,652,203 B2 | 5/2023 | Zagars et al. |
| 11,742,525 B2 | 8/2023 | Aranami et al. |
| 11,749,804 B2 | 9/2023 | Chen et al. |
| 11,757,129 B2 | 9/2023 | Tan et al. |
| 11,764,353 B2 | 9/2023 | Ota et al. |
| 11,799,085 B2 | 10/2023 | Chae et al. |
| 11,804,595 B2 | 10/2023 | Ota et al. |
| 11,811,119 B2 | 11/2023 | Chiang et al. |
| 11,831,026 B2 | 11/2023 | Ota et al. |
| 11,855,250 B2 | 12/2023 | Taylor et al. |
| 11,876,194 B2 | 1/2024 | Chiang et al. |
| 11,888,144 B2 | 1/2024 | Slocum et al. |
| 11,909,077 B2 | 2/2024 | Chiang et al. |
| 11,942,654 B2 | 3/2024 | Bazzarella et al. |
| 11,961,990 B2 | 4/2024 | Ota et al. |
| 11,984,564 B1 | 5/2024 | Chen |
| 12,009,551 B2 | 6/2024 | Bazzarella et al. |
| 12,068,486 B2 | 8/2024 | Lawrence et al. |
| 2001/0000485 A1 | 4/2001 | Ying et al. |
| 2001/0038938 A1 | 11/2001 | Takahashi et al. |
| 2001/0053475 A1 | 12/2001 | Ying et al. |
| 2002/0092155 A1 | 7/2002 | Carlson et al. |
| 2002/0141029 A1 | 10/2002 | Carlson et al. |
| 2003/0003363 A1 | 1/2003 | Daido et al. |
| 2003/0003369 A1 | 1/2003 | Dai |
| 2003/0035995 A1 | 2/2003 | Ohsaki et al. |
| 2003/0059675 A1 | 3/2003 | Sasaki et al. |
| 2003/0118910 A1 | 6/2003 | Carlson |
| 2003/0124429 A1 | 7/2003 | Okada et al. |
| 2003/0171784 A1 | 9/2003 | Dodd et al. |
| 2004/0038090 A1 | 2/2004 | Faris |
| 2004/0043295 A1 | 3/2004 | Rodriguez et al. |
| 2004/0058246 A1 | 3/2004 | Choi et al. |
| 2004/0175626 A1 | 9/2004 | Dasgupta et al. |
| 2004/0185335 A1 | 9/2004 | Carlson |
| 2004/0188880 A1 | 9/2004 | Bauer et al. |
| 2004/0241540 A1 | 12/2004 | Tsutsumi et al. |
| 2005/0022370 A1 | 2/2005 | Fu et al. |
| 2005/0026037 A1 | 2/2005 | Riley et al. |
| 2005/0221190 A1 | 10/2005 | Sudano et al. |
| 2005/0255345 A1 | 11/2005 | Gerritse et al. |
| 2005/0255769 A1 | 11/2005 | Henninge et al. |
| 2005/0266305 A1 | 12/2005 | Ohata et al. |
| 2006/0008698 A1 | 1/2006 | Kim et al. |
| 2006/0127753 A1 | 6/2006 | Nakashima et al. |
| 2006/0172158 A1 | 8/2006 | Min et al. |
| 2006/0172185 A1 | 8/2006 | Mimura |
| 2006/0177732 A1 | 8/2006 | Visco et al. |
| 2006/0222954 A1 | 10/2006 | Skotheim et al. |
| 2006/0275661 A1 | 12/2006 | Kim et al. |
| 2007/0009803 A1 | 1/2007 | Kim et al. |
| 2007/0065714 A1 | 3/2007 | Hambitzer et al. |
| 2007/0108120 A1 | 5/2007 | Carlson |
| 2007/0110990 A1 | 5/2007 | Carlson |
| 2007/0111070 A1 | 5/2007 | Carlson |
| 2007/0178384 A1 | 8/2007 | Kajita et al. |
| 2007/0184350 A1 | 8/2007 | Kim et al. |
| 2007/0189959 A1 | 8/2007 | Carlson et al. |
| 2007/0190408 A1 | 8/2007 | Inoue et al. |
| 2007/0204458 A1 | 9/2007 | Fujita et al. |
| 2007/0243460 A1 | 10/2007 | Carlson et al. |
| 2007/0269714 A1 | 11/2007 | Watanabe et al. |
| 2007/0275298 A1 | 11/2007 | Igoris et al. |
| 2008/0032197 A1 | 2/2008 | Horpel et al. |
| 2008/0160412 A1 | 7/2008 | Kasamatsu et al. |
| 2008/0166202 A1 | 7/2008 | Dunlap et al. |
| 2008/0193845 A1 | 8/2008 | Muraoka et al. |
| 2008/0285208 A1 | 11/2008 | Sung et al. |
| 2009/0011337 A1 | 1/2009 | Kajita et al. |
| 2009/0017380 A1 | 1/2009 | Honda et al. |
| 2009/0029261 A1 | 1/2009 | Thomas-Alyea et al. |
| 2009/0067119 A1 | 3/2009 | Katayama et al. |
| 2009/0087728 A1 | 4/2009 | Less et al. |
| 2009/0098457 A1 | 4/2009 | Kwon et al. |
| 2009/0155676 A1 | 6/2009 | Zhamu et al. |
| 2009/0155678 A1 | 6/2009 | Less et al. |
| 2009/0197183 A1 | 8/2009 | Kato |
| 2009/0202912 A1 | 8/2009 | Baba et al. |
| 2009/0246631 A1 | 10/2009 | Hojo et al. |
| 2009/0246636 A1 | 10/2009 | Chiang et al. |
| 2009/0269489 A1 | 10/2009 | Hennige et al. |
| 2009/0290288 A1 | 11/2009 | Mitchell et al. |
| 2009/0311587 A1 | 12/2009 | Best et al. |
| 2010/0003592 A1 | 1/2010 | Baba et al. |
| 2010/0003595 A1 | 1/2010 | Issaev et al. |
| 2010/0047671 A1 | 2/2010 | Chiang et al. |
| 2010/0055370 A1 | 3/2010 | Diehl et al. |
| 2010/0104817 A1 | 4/2010 | Carlson |
| 2010/0175245 A1 | 7/2010 | Do et al. |
| 2010/0261065 A1 | 10/2010 | Babinec et al. |
| 2010/0285352 A1 | 11/2010 | Juzkow et al. |
| 2010/0323264 A1 | 12/2010 | Chiang et al. |
| 2011/0052987 A1 | 3/2011 | Katayama et al. |
| 2011/0097623 A1 | 4/2011 | Marinis, Jr. et al. |
| 2011/0189520 A1 | 8/2011 | Carter et al. |
| 2011/0200848 A1 | 8/2011 | Chiang et al. |
| 2011/0228385 A1 | 9/2011 | Avison et al. |
| 2011/0274948 A1 | 11/2011 | Duduta et al. |
| 2011/0281171 A1 | 11/2011 | Yong et al. |
| 2012/0028129 A1 | 2/2012 | Furuya |

(56) References Cited

U.S. PATENT DOCUMENTS

| | | |
|---|---|---|
| 2012/0050848 A1 | 3/2012 | Carlson et al. |
| 2012/0069429 A1 | 3/2012 | Barrett et al. |
| 2012/0107680 A1 | 5/2012 | Amiruddin et al. |
| 2012/0115029 A1 | 5/2012 | Carlson |
| 2012/0135257 A1 | 5/2012 | Carlson et al. |
| 2012/0141877 A1 | 6/2012 | Choi et al. |
| 2012/0164499 A1 | 6/2012 | Chiang et al. |
| 2012/0189898 A1 | 7/2012 | Wakizaka et al. |
| 2012/0231321 A1 | 9/2012 | Huang et al. |
| 2012/0258348 A1 | 10/2012 | Hayakawa et al. |
| 2013/0055559 A1 | 3/2013 | Slocum et al. |
| 2013/0065122 A1 | 3/2013 | Chiang et al. |
| 2013/0089770 A1 | 4/2013 | Nishikawa |
| 2013/0149613 A1 | 6/2013 | Yoshikawa et al. |
| 2013/0171500 A1 | 7/2013 | Xu et al. |
| 2013/0260207 A1 | 10/2013 | Uemura |
| 2013/0309547 A1 | 11/2013 | Bazzarella et al. |
| 2013/0323542 A1 | 12/2013 | Wijayawardhana et al. |
| 2013/0337319 A1 | 12/2013 | Doherty et al. |
| 2013/0337349 A1 | 12/2013 | Brost et al. |
| 2013/0344367 A1 | 12/2013 | Chiang et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0065464 A1 | 3/2014 | Masarapu et al. |
| 2014/0154546 A1 | 6/2014 | Carter et al. |
| 2014/0170464 A1 | 6/2014 | Iwase |
| 2014/0170524 A1 | 6/2014 | Chiang et al. |
| 2014/0248521 A1 | 9/2014 | Chiang et al. |
| 2014/0315084 A1 | 10/2014 | Liu et al. |
| 2014/0315097 A1 | 10/2014 | Tan et al. |
| 2015/0024279 A1 | 1/2015 | Tan et al. |
| 2015/0030933 A1 | 1/2015 | Goetzen et al. |
| 2015/0056426 A1 | 2/2015 | Grouchko et al. |
| 2015/0129081 A1 | 5/2015 | Chiang et al. |
| 2015/0140371 A1 | 5/2015 | Slocum |
| 2015/0162586 A1 | 6/2015 | Fleischmann et al. |
| 2015/0171398 A1 | 6/2015 | Roumi |
| 2015/0171406 A1 | 6/2015 | Bazzarella et al. |
| 2015/0249249 A1 | 9/2015 | Ortega et al. |
| 2015/0280267 A1 | 10/2015 | Chiang et al. |
| 2015/0295272 A1 | 10/2015 | Chiang et al. |
| 2015/0299551 A1 | 10/2015 | Ota et al. |
| 2015/0340676 A1 | 11/2015 | Schmidhauser et al. |
| 2015/0357626 A1 | 12/2015 | Holman et al. |
| 2015/0364790 A1 | 12/2015 | Yonehara et al. |
| 2016/0006081 A1 | 1/2016 | Eaglesham et al. |
| 2016/0013461 A1 | 1/2016 | Mizuno et al. |
| 2016/0013507 A1 | 1/2016 | Chiang et al. |
| 2016/0054590 A1 | 2/2016 | Flitsch et al. |
| 2016/0056437 A1 | 2/2016 | Huang et al. |
| 2016/0056490 A1 | 2/2016 | Chiang et al. |
| 2016/0056491 A1 | 2/2016 | Chiang et al. |
| 2016/0093884 A1 | 3/2016 | Cui et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0141579 A1 | 5/2016 | Seok et al. |
| 2016/0141621 A1 | 5/2016 | Negishi et al. |
| 2016/0190536 A1 | 6/2016 | Park et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372784 A1 | 12/2016 | Hayner et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0098857 A1 | 4/2017 | Carlson et al. |
| 2017/0149088 A1 | 5/2017 | Ueno et al. |
| 2017/0162863 A1 | 6/2017 | Doherty et al. |
| 2017/0187078 A1 | 6/2017 | Keates et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0271638 A1 | 9/2017 | Xu et al. |
| 2017/0288281 A1 | 10/2017 | Chiang et al. |
| 2017/0324073 A1 | 11/2017 | Herle |
| 2018/0034090 A1 | 2/2018 | Chiang et al. |
| 2018/0108893 A1 | 4/2018 | Yang |
| 2018/0175428 A1 | 6/2018 | Chiang et al. |
| 2018/0175445 A1 | 6/2018 | Tan et al. |
| 2018/0219250 A1 | 8/2018 | Delobel et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0044196 A1 | 2/2019 | Kang et al. |
| 2019/0058184 A1 | 2/2019 | Bazzarella et al. |
| 2019/0181496 A1 | 6/2019 | Visco et al. |
| 2019/0245242 A1 | 8/2019 | Tan et al. |
| 2019/0267598 A1 | 8/2019 | Xu et al. |
| 2019/0319460 A1 | 10/2019 | Taylor et al. |
| 2019/0326562 A1 | 10/2019 | Ota et al. |
| 2019/0348705 A1* | 11/2019 | Chen .................. H01M 50/449 |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0144686 A1 | 5/2020 | Jang et al. |
| 2020/0161688 A1 | 5/2020 | Chiang et al. |
| 2020/0207237 A1 | 7/2020 | Zuo et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0266407 A1 | 8/2020 | Honda et al. |
| 2020/0266479 A1 | 8/2020 | Hupfer et al. |
| 2020/0303707 A1 | 9/2020 | Zhou et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0395069 A1 | 12/2020 | Tang et al. |
| 2020/0395583 A1 | 12/2020 | Carlson et al. |
| 2020/0411825 A1 | 12/2020 | Bazzarella et al. |
| 2021/0080364 A1 | 3/2021 | Lee et al. |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0257679 A1 | 8/2021 | Tour et al. |
| 2021/0265631 A1 | 8/2021 | Chen et al. |
| 2021/0273268 A1 | 9/2021 | Yu et al. |
| 2021/0296733 A1 | 9/2021 | Carlson et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2022/0006157 A1* | 1/2022 | Nakazawa .......... H01M 50/417 |
| 2022/0021019 A1 | 1/2022 | Tan et al. |
| 2022/0029207 A1 | 1/2022 | Chiang et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0294079 A1 | 9/2022 | Zhang et al. |
| 2022/0299572 A1 | 9/2022 | Aoki |

(56) References Cited

U.S. PATENT DOCUMENTS

| | | |
|---|---|---|
| 2022/0344775 A1 | 10/2022 | Carlson et al. |
| 2022/0344776 A1 | 10/2022 | Carlson |
| 2022/0352597 A1 | 11/2022 | Chen et al. |
| 2022/0352598 A1 | 11/2022 | Avison et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |
| 2023/0098274 A1 | 3/2023 | Carlson et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0238562 A1 | 7/2023 | Kusachi et al. |
| 2023/0261247 A1 | 8/2023 | Ju et al. |
| 2023/0282906 A1 | 9/2023 | Chen et al. |
| 2023/0291063 A1 | 9/2023 | Holman et al. |
| 2023/0307803 A1 | 9/2023 | Bazzarella et al. |
| 2023/0327068 A1 | 10/2023 | Tyler et al. |
| 2023/0327077 A1 | 10/2023 | Zagars et al. |
| 2023/0327178 A1 | 10/2023 | Taylor et al. |
| 2023/0335748 A1 | 10/2023 | Chen et al. |
| 2023/0352755 A1 | 11/2023 | Aragon et al. |
| 2023/0369603 A1 | 11/2023 | Ota et al. |
| 2023/0369719 A1 | 11/2023 | Bazzarella et al. |
| 2023/0378512 A1 | 11/2023 | Bazzarella et al. |
| 2023/0395771 A1 | 12/2023 | Zagars et al. |
| 2023/0411695 A1 | 12/2023 | Narita et al. |
| 2024/0039001 A1 | 2/2024 | Kusachi et al. |
| 2024/0039120 A1 | 2/2024 | Carlson |
| 2024/0047689 A1 | 2/2024 | Hartzog et al. |
| 2024/0047772 A1 | 2/2024 | Hartzog et al. |
| 2024/0055702 A1 | 2/2024 | Ota et al. |
| 2024/0063417 A1 | 2/2024 | Chiang et al. |
| 2024/0079647 A1 | 3/2024 | Tan et al. |
| 2024/0088355 A1 | 3/2024 | Ota et al. |
| 2024/0106003 A1 | 3/2024 | Aranami et al. |
| 2024/0128541 A1 | 4/2024 | Nematollahi |
| 2024/0178502 A1 | 5/2024 | Ota |
| 2024/0204264 A1 | 6/2024 | Chen |
| 2024/0204288 A1 | 6/2024 | Nematollahi |
| 2024/0213572 A1 | 6/2024 | Nematollahi |
| 2024/0234705 A1 | 7/2024 | Ota et al. |
| 2024/0274855 A1 | 8/2024 | Chiang et al. |
| 2024/0304942 A1 | 9/2024 | Patel et al. |
| 2025/0054939 A1 | 2/2025 | Aranami |

FOREIGN PATENT DOCUMENTS

| | | |
|---|---|---|
| CN | 1285084 A | 2/2001 |
| CN | 1492523 A | 4/2004 |
| CN | 1167163 C | 9/2004 |
| CN | 1175505 C | 11/2004 |
| CN | 101796668 A | 8/2010 |
| CN | 101946344 A | 1/2011 |
| CN | 102242464 A | 11/2011 |
| CN | 102437302 A | 5/2012 |
| CN | 102460772 A | 5/2012 |
| CN | 102640329 A | 8/2012 |
| CN | 102769116 A | 11/2012 |
| CN | 102959765 A | 3/2013 |
| CN | 101796668 B | 8/2013 |
| CN | 103262305 A | 8/2013 |
| CN | 103282408 A | 9/2013 |
| CN | 103283060 A | 9/2013 |
| CN | 102640329 B | 11/2015 |
| CN | 105247703 A | 1/2016 |
| EP | 0143562 A1 | 6/1985 |
| EP | 0523840 A1 | 1/1993 |
| EP | 0600718 A2 | 6/1994 |
| EP | 0523840 B1 | 4/1996 |
| EP | 0814520 A2 | 12/1997 |
| EP | 0836238 A1 | 4/1998 |
| EP | 0848435 A1 | 6/1998 |
| EP | 0875950 A2 | 11/1998 |
| EP | 0892449 A1 | 1/1999 |
| EP | 0600718 B1 | 4/2000 |
| EP | 1156544 A2 | 11/2001 |
| EP | 0836238 B1 | 11/2005 |
| EP | 0848435 B1 | 5/2007 |
| EP | 3133671 A1 | 2/2017 |
| EP | 4117104 A1 | 1/2023 |
| FR | 3007207 A1 | 12/2014 |
| JP | S4610339 Y1 | 4/1971 |
| JP | H05283108 A | 10/1993 |
| JP | H0614077 A | 1/1994 |
| JP | H06140077 A | 5/1994 |
| JP | H06275313 A | 9/1994 |
| JP | H087895 A | 1/1996 |
| JP | H08255615 A | 10/1996 |
| JP | H0927343 A | 1/1997 |
| JP | H10214639 A | 8/1998 |
| JP | H11233144 A | 8/1999 |
| JP | 2000011986 A | 1/2000 |
| JP | 2000323129 A | 11/2000 |
| JP | 2001143690 A | 5/2001 |
| JP | 2002042882 A | 2/2002 |
| JP | 2002203542 A | 7/2002 |
| JP | 2002532852 A | 10/2002 |
| JP | 2003517418 A | 5/2003 |
| JP | 2003223926 A | 8/2003 |
| JP | 2004119367 A | 4/2004 |
| JP | 2005022674 A | 1/2005 |
| JP | 2005190785 A | 7/2005 |
| JP | 2005235695 A | 9/2005 |
| JP | 2006236994 A | 9/2006 |
| JP | 2006269358 A | 10/2006 |
| JP | 2007227136 A | 9/2007 |
| JP | 2007258160 A | 10/2007 |
| JP | 2008041404 A | 2/2008 |
| JP | 2008048838 A | 3/2008 |
| JP | 2008066094 A | 3/2008 |
| JP | 2008123988 A | 5/2008 |
| JP | 2008140551 A | 6/2008 |
| JP | 2008171593 A | 7/2008 |
| JP | 2008210541 A | 9/2008 |
| JP | 2008226566 A | 9/2008 |
| JP | 2008234879 A | 10/2008 |
| JP | 2008266593 A | 11/2008 |
| JP | 2009064566 A | 3/2009 |
| JP | 2009176552 A | 8/2009 |
| JP | 2009188037 A | 8/2009 |
| JP | 4426721 B2 | 3/2010 |
| JP | 2010056036 A | 3/2010 |
| JP | 2010123383 A | 6/2010 |
| JP | 2010202987 A | 9/2010 |
| JP | 2011065849 A | 3/2011 |
| JP | 2011233144 A | 11/2011 |
| JP | 2012018773 A | 1/2012 |
| JP | 2012069283 A | 4/2012 |
| JP | 4932263 B2 | 5/2012 |
| JP | 5183016 B2 | 4/2013 |
| JP | 2013161684 A | 8/2013 |
| JP | 2013535113 A | 9/2013 |
| JP | 2013535773 A | 9/2013 |
| JP | 2013211185 A | 10/2013 |
| JP | 2014127440 A | 7/2014 |
| JP | 2015018635 A | 1/2015 |
| JP | 2015504234 A | 2/2015 |
| JP | 2015230796 A | 12/2015 |
| JP | 2016110886 A | 6/2016 |
| JP | 2016517161 A | 6/2016 |
| JP | 2016149202 A | 8/2016 |
| JP | 6275313 B2 | 2/2018 |
| JP | 2021093379 A | 6/2021 |
| KR | 20070069171 A | 7/2007 |
| KR | 20080063793 A | 7/2008 |
| KR | 20090026190 A | 3/2009 |
| KR | 20090052556 A | 5/2009 |
| KR | 20090123894 A | 12/2009 |
| KR | 20100137530 A | 12/2010 |
| KR | 20110079744 A | 7/2011 |
| KR | 20110116489 A | 10/2011 |
| KR | 20120062333 A | 6/2012 |

(56) References Cited

FOREIGN PATENT DOCUMENTS

| | | |
|---|---|---|
| KR | 20120110111 A | 10/2012 |
| KR | 20130036043 A | 4/2013 |
| KR | 20130054346 A | 5/2013 |
| KR | 20140024464 A | 2/2014 |
| KR | 20150108040 A | 9/2015 |
| WO | WO-9102385 A1 | 2/1991 |
| WO | WO-9103080 A1 | 3/1991 |
| WO | WO-9708763 A1 | 3/1997 |
| WO | WO-9931751 A1 | 6/1999 |
| WO | WO-9933125 A1 | 7/1999 |
| WO | WO-9957770 A1 | 11/1999 |
| WO | WO-0076011 A2 | 12/2000 |
| WO | WO-0103824 A1 | 1/2001 |
| WO | WO-0076011 A3 | 4/2001 |
| WO | WO-0139293 A2 | 5/2001 |
| WO | WO-0139303 A1 | 5/2001 |
| WO | WO-2005011043 A1 | 2/2005 |
| WO | WO-2005022674 A1 | 3/2005 |
| WO | WO-2006080265 A1 | 8/2006 |
| WO | WO-2006123892 A1 | 11/2006 |
| WO | WO-2007006011 A2 | 1/2007 |
| WO | WO-2007076011 A1 | 7/2007 |
| WO | WO-2007095348 A2 | 8/2007 |
| WO | WO-2007135790 A1 | 11/2007 |
| WO | WO-2007120763 A3 | 3/2008 |
| WO | WO-2008087966 A1 | 7/2008 |
| WO | WO-2008099468 A1 | 8/2008 |
| WO | WO-2008114727 A1 | 9/2008 |
| WO | WO-2008143005 A1 | 11/2008 |
| WO | WO-2008150070 A1 | 12/2008 |
| WO | WO-2009014388 A2 | 1/2009 |
| WO | WO-2009026467 A1 | 2/2009 |
| WO | WO-2009044741 A1 | 4/2009 |
| WO | WO-2009066946 A2 | 5/2009 |
| WO | WO-2009066946 A3 | 8/2009 |
| WO | WO-2009120812 A2 | 10/2009 |
| WO | WO-2010016881 A1 | 2/2010 |
| WO | WO-2010103824 A1 | 9/2010 |
| WO | WO-2010138176 A1 | 12/2010 |
| WO | WO-2010138177 A1 | 12/2010 |
| WO | WO-2010138179 A1 | 12/2010 |
| WO | WO-2011065849 A1 | 6/2011 |
| WO | WO-2012005139 A1 | 1/2012 |
| WO | WO-2012011157 A1 | 1/2012 |
| WO | WO-2012011944 A2 | 1/2012 |
| WO | WO-2012113157 A1 | 8/2012 |
| WO | WO-2013139303 A1 | 9/2013 |
| WO | WO-2013146126 A1 | 10/2013 |
| WO | WO-2014052533 A1 | 4/2014 |
| WO | WO-2014119665 A1 | 8/2014 |
| WO | WO-2014179355 A1 | 11/2014 |
| WO | WO-2015004069 A1 | 1/2015 |
| WO | WO-2015074065 A1 * | 5/2015 .......... H01M 10/052 |
| WO | WO-2016168715 A1 | 10/2016 |
| WO | WO-2017008081 A1 | 1/2017 |
| WO | WO-2018050067 A1 | 3/2018 |
| WO | WO-2019074925 A1 | 4/2019 |
| WO | WO-2019136467 A1 | 7/2019 |
| WO | WO-2021087465 A1 | 5/2021 |
| WO | WO-2022040103 A1 | 2/2022 |
| WO | WO-2022232625 A2 | 11/2022 |
| WO | WO-2024130246 A1 | 6/2024 |

OTHER PUBLICATIONS

Kim et al., "Preparation of a Trilayer Separator and its Application to Lithium-ion Batteries", Journal of Power Sources, Elsevier SA, CH, Jul. 2, 2010, vol. 195, No. 24, pp. 8302-8305.
Nestler et al., "Separators—Technology Review: Ceramic based Separators for Secondary Batteries," AIP Conference Proceedings, Jan. 1, 2014, vol. 1597(1), pp. 155-184, New York, US, ISSN: 3084-243X, DOI: 10, 1063/1.4878486.
Takemura et al., "A Powder Particle Size Effect on Ceramic Powder Based Separator for Lithium Rechargeable Battery," Journal of Power Sources, Aug. 2005, vol. 146(102), pp. 779-783.
Uhlhorn, et al., "Synthesis of Ceramic Membranes: Part I Synthesis of non-supported and supported γ-alumina membranes without defects," Journal of Materials Science, Jan. 1992, 27, pp. 527-537.
Steven et al., U.S. Appl. No. 60/773,487 titled "Methods of preparing separators for electrochemical cells", filed on Feb. 15, 2006, 30 pages.
Zhang et al., "Sulfonated polyimide/AlOOH composite membranes with decreased vanadium permeability and increased stability for vanadium redox flow battery", Journal of Solid State Electrochemistry, Springer, Berlin, DE, vol. 18, No. 12, Jul. 18, 2014, pp. 3479-3490.
Co-pending U.S. Appl. No. 15/262,581, inventor Chiang; Yet-Ming, filed on Sep. 12, 2016.
Co-pending U.S. Appl. No. 15/425,368, inventor Slocum; Alexander H., filed on Feb. 6, 2017.
Co-pending U.S. Appl. No. 16/139,791, inventors Ota; Naoki et al., filed on Sep. 24, 2018.
Co-pending U.S. Appl. No. 16/736,553, inventors Ota; Naoki et al., filed on Jan. 7, 2020.
Co-pending U.S. Appl. No. 18/223,894, inventors Chen; Junzheng et al., filed on Jul. 19, 2023.
Co-pending U.S. Appl. No. 18/411,431, inventors Chiang; Yet-Ming et al., filed on Jan. 12, 2024.
Co-pending U.S. Appl. No. 18/442,938, inventors Bazzarella; Ricardo et al., filed on Feb. 15, 2024.
Co-pending U.S. Appl. No. 18/510,473, inventor Taylor; Tony L., filed on Nov. 15, 2023.
Co-pending U.S. Appl. No. 18/526,405, inventor Chiang; Yet-Ming, filed on Dec. 1, 2023.
Co-pending U.S. Appl. No. 18/629,597, inventors Ota; Naoki et al., filed on Apr. 8, 2024.
Co-pending U.S. Appl. No. 18/658,725, inventor Bazzarella; Ricardo, filed on May 8, 2024.
Co-pending U.S. Appl. No. 18/760,721, inventors Lawrence; Ryan Michael et al., filed on Jul. 1, 2024.
Co-pending U.S. Appl. No. 18/763,907, inventors Bazzarella; Ricardo et al., filed on Jul. 3, 2024.
Co-pending U.S. Appl. No. 18/773,019, inventor Tan; Taison, filed on Jul. 15, 2024.
Co-pending U.S. Appl. No. 18/777,389, inventor Chen; Junzheng, filed on Jul. 18, 2024.
Co-pending U.S. Appl. No. 18/777,403, inventor Chen; Junzheng, filed on Jul. 18, 2024.
Corrected Notice of Allowance for U.S. Appl. No. 18/543,959, mailed Jul. 31, 2024, 2 pages.
Gomez-Martin et al., "Opportunities and Challenges of Li2C4O4 as Pre-Lithiation Additive for the Positive Electrode in NMC622∥Silicon/Graphite Lithium Ion Cells," Advanced Science, Aug. 2022, 9(24):2201742, 15 pages.
Ikezawa A., et al., "Performance of Li4Ti5O12-based Reference Electrode for the Electrochemical Analysis of All-solid-state Lithium-ion Batteries," Electrochemistry Communications, Jul. 2020, vol. 116: 106743, 5 pages.
International Preliminary Report on Patentability for Application No. PCT/US2020/058564, mailed May 12, 2022, 9 pages.
International Preliminary Report on Patentability for International Application No. PCT/US2022/027104 dated Nov. 9, 2023, 8 pages.
International Search Report and Written Opinion for Application No. PCT/US2022/027104, mailed Dec. 13, 2022, 12 pages.
International Search Report and Written Opinion for International Application No. PCT/US2020/058564, mailed Feb. 1, 2021, 12 pages.
International Search Report and Written Opinion for International Application No. PCT/US2023/084611 dated Apr. 18, 2024, 9 pages.
Lawrence et al., U.S. Appl. No. 63/622,201, titled "Systems and methods of folding electrochemical cell tabs for energy density improvement", filed Jan. 28, 2024, 23 pages.
Liu et al., "Controllable long-term lithium replenishment for enhancing energy density and cycle life of lithium-ion batteries," Energy & Environmental Science, 2024, 17(3):1163-1174.

(56) References Cited

OTHER PUBLICATIONS

Matsuzaki et al., "Application of Na2CO3 as a Sacrificial Electrode Additive in Na- ion Batteries to Compensate for the Sodium Deficiency in Na2/3[Fe1/2Mn1/2]O2," Batteries & Supercaps, May 2024, 7(5):e202400009, 9 pages.
Non-Final Office Action for U.S. Appl. No. 18/543,515 dated Feb. 9, 2024, 14 pages.
Non-Final Office Action for U.S. Appl. No. 18/543,959 dated May 1, 2024, 8 pages.
Notice of Allowance for U.S. Appl. No. 18/543,515 dated Apr. 4, 2024, 10 pages.
Notice of Allowance for U.S. Appl. No. 18/543,959 mailed Jul. 22, 2024, 9 pages.
Notice of Allowance for U.S. Appl. No. 18/650,789 mailed Jul. 19, 2024, 8 pages.
Piana M., et al., "Stability of a Pyrrolidinum-Based Ionic Liquid in Li-0 2 Cells," Journal of the Electrochemical Society, Jan. 2014, vol. 161(14), pp. A1992-A2001.
Restriction Requirement for U.S. Appl. No. 18/543,959, mailed Apr. 9, 2024, 6 pages.
Non-Final Office Action for U.S. Appl. No. 18/777,389 mailed Dec. 3, 2024, 11 pages.
Non-Final Office Action for U.S. Appl. No. 18/777,403 mailed Jan. 16, 2025, 7 pages.
Restriction Requirement for U.S. Appl. No. 17/733,658 mailed Nov. 25, 2024, 7 pages.

\* cited by examiner

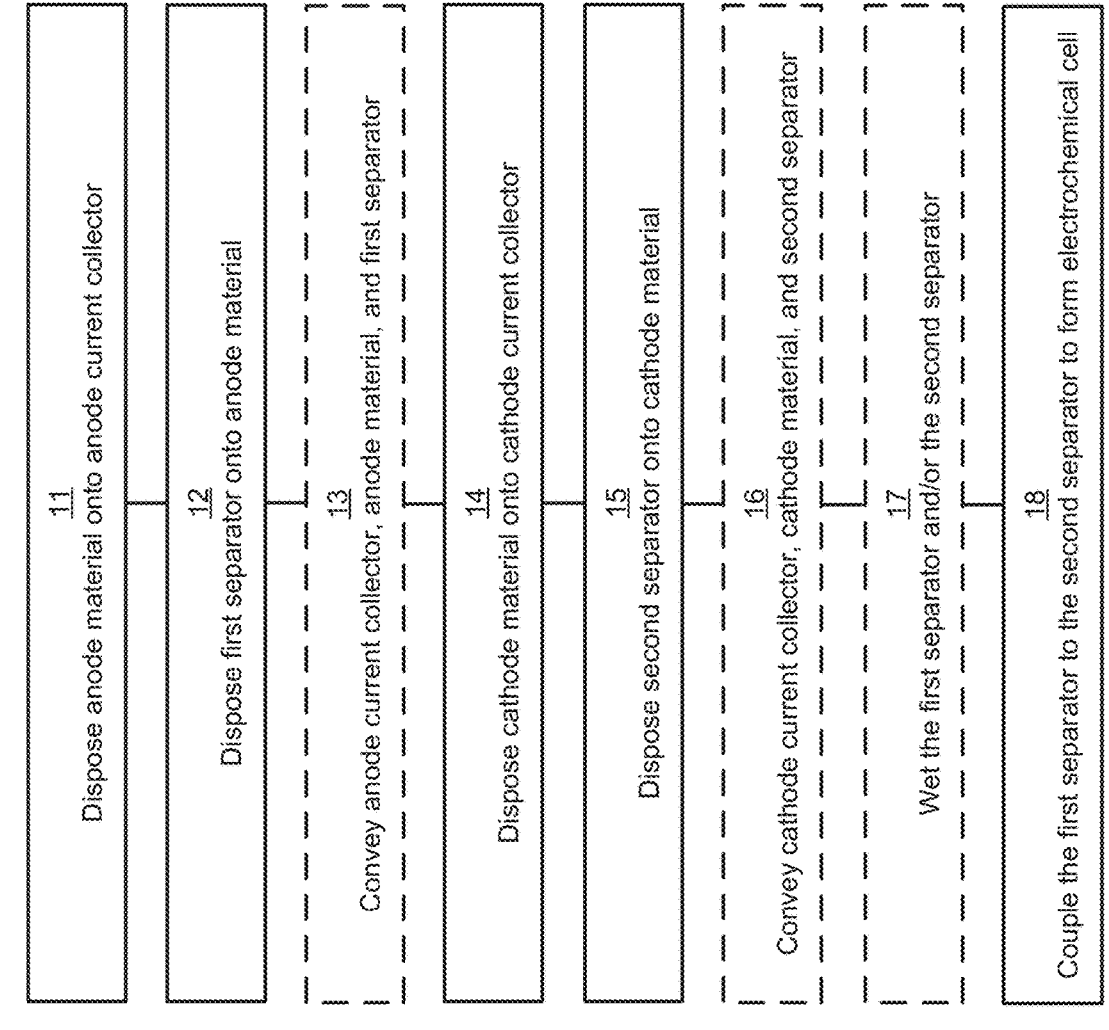

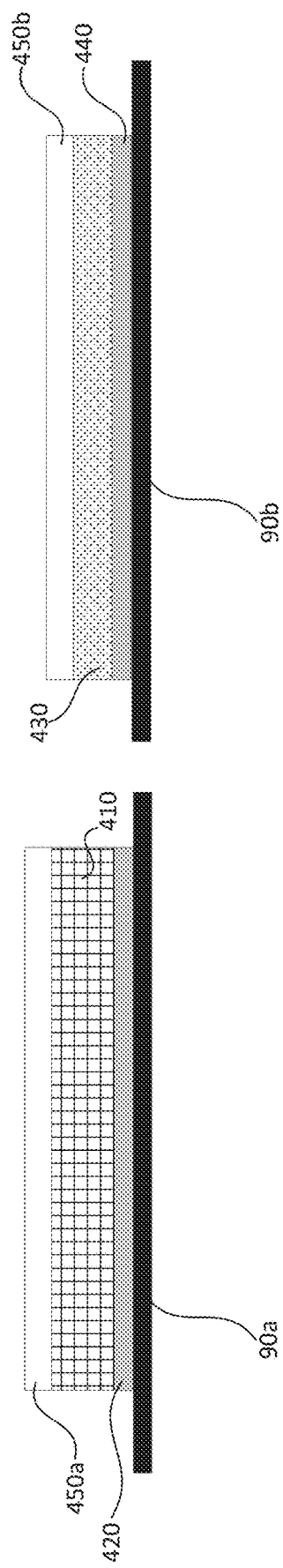

# ELECTROCHEMICAL CELLS WITH MULTIPLE SEPARATORS, AND METHODS OF PRODUCING THE SAME

CROSS-REFERENCE TO RELATED APPLICATIONS

The present application is a continuation of U.S. patent application Ser. No. 17/733,658, filed Apr. 29, 2022, and entitled "Electrochemical Cells with Multiple Separators, and Methods of Producing the Same," which claims priority to and benefit of U.S. Provisional Application No. 63/181,721, filed Apr. 29, 2021, and entitled "Electrochemical Cells with Multiple Separators and Methods of Producing the Same," the entire disclosures of which are incorporated herein by reference.

TECHNICAL FIELD

Embodiments described herein relate to electrochemical cells with multiple separators, and methods of producing the same.

BACKGROUND

Electrolyte is added to electrodes during production of electrochemical cells. Electrolyte is often in the form of an electrolyte solvent with an electrolyte salt dissolved therein. Conventional electrochemical cell production processes include forming solid electrodes, placing them in a container and adding the electrolyte to the container. However, formation of semi-solid electrodes can include adding an electrolyte solution to an active material and a conductive material to form a slurry. During the production process, the slurry can be moved from one location to another, and electrolyte solvent can evaporate from the slurry. This solvent can be costly to replace. Preventing solvent evaporation rather than replacing evaporated solvent can significantly reduce costs associated with production of electrochemical cells.

SUMMARY

Embodiments described herein relate to electrochemical cells with multiple separators, and methods of producing the same. A method of producing an electrochemical cell can include disposing an anode material onto an anode current collector, disposing a first separator on the anode material, disposing a cathode material onto a cathode current collector, disposing a second separator onto the cathode material, and disposing the first separator on the second separator to form the electrochemical cell. The anode material and/or the cathode material can be a semi-solid electrode material including an active material, a conductive material, and a volume of liquid electrolyte. In some embodiments, less than about 10% by volume of the liquid electrolyte evaporates during the forming of the electrochemical cell. In some embodiments, the method can further include wetting the first separator and/or the second separator with an electrolyte solution prior to coupling the first separator to the second separator. In some embodiments, the wetting is via spraying. In some embodiments, less than about 10% by volume of the electrolyte solution evaporates during the forming of the electrochemical cell. In some embodiments, less than about 10% of a total volume of a combination of the electrolyte solution and the liquid electrolyte can evaporate during the forming of the electrochemical cell. In some embodiments, the first separator and/or the second separator can be composed of a material with a porosity of less than about 1%. In some embodiments, the cathode current collector, the cathode material, and the second separator can collectively form a cathode, and the method further comprises conveying the cathode along a cathode conveyor. In some embodiments, the anode current collector, the anode material, and the first separator can collectively form an anode, and the method further comprises conveying the anode along an anode conveyor. In some embodiments, the anode conveyor can be the same conveyor as the cathode conveyor. In some embodiments, the anode conveyor can be a different conveyor from the cathode conveyor.

BRIEF DESCRIPTION OF THE DRAWINGS

FIG. 3 is a block diagram of a method of manufacturing an electrochemical cell with multiple separators, according to an embodiment.

FIGS. 4A-4C show methods of conveyance of electrodes, according to various embodiments.

DETAILED DESCRIPTION

Figure 1:
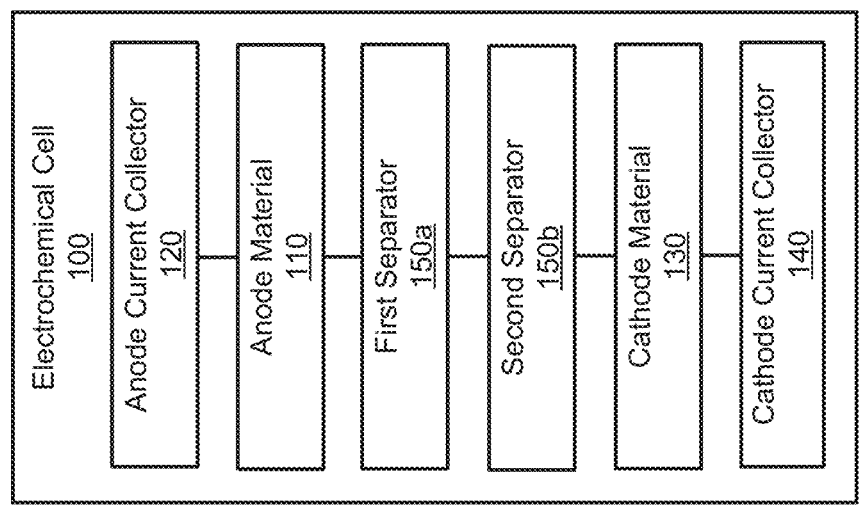
FIG. 1 is a block diagram an electrochemical cell with multiple separators, according to an embodiment.

Embodiments described herein relate to multi-separator electrochemical cells and systems, and methods of manufacturing the same. Separators in electrochemical cells physically isolate an anode from a cathode so as to prevent short circuits and maintain a voltage difference between the anode and the cathode. Pores in separators allow passage of electroactive species therethrough. Separators can have an additional benefit of shielding evaporation of electrolyte solution during production.

In some embodiments, electrodes described herein can be semi-solid electrodes. In comparison to conventional electrodes, semi-solid electrodes can be made (i) thicker (e.g., greater than about 250 μm—up to about 2,000 μm or even greater) due to the reduced tortuosity and higher electronic conductivity of semi-solid electrodes, (ii) with higher loadings of active materials, (iii) with a simplified manufacturing process utilizing less equipment, and (iv) can be operated between a wide range of C-rates while maintaining a substantial portion of their theoretical charge capacity. These relatively thick semi-solid electrodes decrease the volume, mass and cost contributions of inactive components with respect to active components, thereby enhancing the commercial appeal of batteries made with the semi-solid electrodes. In some embodiments, the semi-solid electrodes described herein, are binderless and/or do not use binders that are used in conventional battery manufacturing. Instead, the volume of the electrode normally occupied by binders in conventional electrodes, is now occupied, by: 1) electrolyte, which has the effect of decreasing tortuosity and increasing the total salt available for ion diffusion, thereby countering the salt depletion effects typical of thick conventional electrodes when used at high rate, 2) active material, which has the effect of increasing the charge capacity of the battery, or 3) conductive additive, which has the effect of increasing the electronic conductivity of the electrode, thereby countering the high internal impedance of thick conventional electrodes. The reduced tortuosity and a higher electronic conductivity of the semi-solid electrodes described herein, results in superior rate capability and charge capacity of electrochemical cells formed from the semi-solid electrodes.

Since the semi-solid electrodes described herein can be made substantially thicker than conventional electrodes, the ratio of active materials (i.e., the semi-solid cathode and/or anode) to inactive materials (i.e., the current collector and separator) can be much higher in a battery formed from electrochemical cell stacks that include semi-solid electrodes relative to a similar battery formed form electrochemical cell stacks that include conventional electrodes. This substantially increases the overall charge capacity and energy density of a battery that includes the semi-solid electrodes described herein. The use of semi-solid, binderless electrodes can also be beneficial in the incorporation of an overcharge protection mechanism, as generated gas can migrate to the electrode/current collector interface without binder particles inhibiting the movement of the gas within the electrode.

In some embodiments, the electrode materials described herein can be a flowable semi-solid or condensed liquid composition. A flowable semi-solid electrode can include a suspension of an electrochemically active material (anodic or cathodic particles or particulates), and optionally an electronically conductive material (e.g., carbon) in a non-aqueous liquid electrolyte. Said another way, the active electrode particles and conductive particles are co-suspended in a liquid electrolyte to produce a semi-solid electrode. Examples of electrochemical cells that include a semi-solid and/or binderless electrode material are described in U.S. Pat. No. 8,993,159 entitled, "Semi-solid Electrodes Having High Rate Capability," filed Apr. 29, 2013 ("the '159 patent"), the disclosure of which is incorporated herein by reference in its entirety.

In some embodiments, the electrode materials described herein can be a flowable semi-solid or condensed liquid composition. In some embodiments, a flowable semi-solid electrode can include a suspension of an electrochemically active material (anodic or cathodic particles or particulates), and optionally an electronically conductive material (e.g., carbon) in a non-aqueous liquid electrolyte. In some embodiments, the active electrode particles and conductive particles can be co-suspended in an electrolyte to produce a semi-solid electrode. In some embodiments, electrode materials described herein can include conventional electrode materials (e.g., including lithium metal).

Semi-solid electrodes have a liquid electrolyte integrated therein during a longer portion of the manufacturing process than conventional electrodes, which add electrolyte solution after the electrodes are fully formed. In other words, liquid electrolyte is added to conductive materials and/or active materials to form a semi-solid electrode material. While the semi-solid electrode material is undergoing further processing, liquid electrolyte solvent can evaporate from the semi-solid electrode material. This evaporation can raise the molarity of electrolyte salt in the electrolyte solution, potentially causing salt buildup. Built-up salt can prevent passage of electroactive species through the semi-solid electrode material. In other words, movement of electroactive species through pores of the semi-solid electrode material can be more difficult when salt ions build up and block flow paths. Additionally, evaporation of electrolyte solution can make the semi-solid electrode material less flowable and/or less malleable. Liquid flow paths within the semi-solid electrode material can dry out, increasing tortuosity of the movements of electroactive species.

While adding electrolyte solvent during production can address some of these problems, make-up electrolyte solvent can add significant cost to the production process. Coupling separators to the anode and/or the cathode during production of the electrochemical cell can aid in reducing evaporation of electrolyte solvent during production. In some embodiments, separators described herein can have geometries and general properties the same or substantially similar to those described in PCT Application US2020/058564 entitled "Electrochemical Cells with Separator Seals, and Methods of Manufacturing the Same," filed Nov. 2, 2020 ("the '564 application"), the disclosure of which is hereby incorporated by reference in its entirety.

FIG. 1 is a block diagram of an electrochemical cell 100 with multiple separators, according to an embodiment. As shown, the electrochemical cell 100 includes an anode material 110 disposed on an anode current collector 120 and a cathode material 130 disposed on a cathode current collector 140, with a first separator 150a and a second separator 150b (collectively referred to as "separators 150") disposed therebetween. In some embodiments, the anode material 110 and/or the cathode material 130 can include a semi-solid electrode material. In some embodiments, the anode material 110 and/or the cathode material 130 can include any of the properties of the semi-solid electrodes described in the '159 patent.

In some embodiments, the anode material 110 and/or the cathode material 130 can include at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, at least about 20%, at least about 21%, at least about 22%, at least about 23%, or at least about 24% by volume of liquid electrolyte solution. In some embodiments, the anode material 110 and/or the cathode material 130 can include no more than about 25%, no more than about 24%, no more than about 23%, no more than about 22%, no more than about 21%, no more than about 20%, no more than about 19%, no more than about 18%, no more than about 17%, no more than about 16%, no more than about 15%, no more than about 14%, no more than about 13%, no more than about 12%, no more than about 11%, no more than about 10%, no more than about 9%, no more than about 8%, no more than about 7%, no more than about 6%, no more than about 5%, no more than about 4%, no more than about 3%, no more than about 2%, no more than about 1%, no more than about 0.9%, no more than about 0.8%, no more than about 0.7%, no more than about 0.6%, no more than about 0.5%, no more than about 0.4%, no more than about 0.3%, or no more than about 0.2% by volume of liquid electrolyte solution.

Combinations of the above-referenced volumetric percentages of liquid electrolyte solution in the anode material 110 and/or the cathode material 130 are also possible (e.g., at least about 0.1% and no more than about 25% or at least about 5% and no more than about 10%), inclusive of all values and ranges therebetween. In some embodiments, the anode material 110 and/or the cathode material 130 can include about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, or about 25% by volume of liquid electrolyte solution.

In some embodiments, the anode current collector 120 and/or the cathode current collector 140 can be composed of copper, aluminum, titanium, or other metals that do not form alloys or intermetallic compounds with lithium, carbon, and/or coatings comprising such materials disposed on another conductor. In some embodiments, the anode current collector 120 and/or the cathode current collector 140 can have a thickness of at least about 1 µm, at least about 5 µm, at least about 10 µm, at least about 15 µm, at least about 20 µm, at least about 25 µm, at least about 30 µm, at least about 35 µm, at least about 40 µm, or at least about 45 µm. In some embodiments, the anode current collector 120 and/or the cathode current collector 140 can have a thickness of no more than about 50 µm, no more than about 45 µm, no more than about 40 µm, no more than about 35 µm, no more than about 30 µm, no more than about 25 µm, no more than about 20 µm, no more than about 15 µm, no more than about 10 µm, or no more than about 5 µm. Combinations of the above-referenced thicknesses of the anode current collector 120 and/or the cathode current collector 140 are also possible (e.g., at least about 1 µm and no more than about 50 µm or at least about 10 µm and no more than about 30 µm), inclusive of all values and ranges therebetween. In some embodiments, the anode current collector 120 and/or the cathode current collector 140 can have a thickness of about 1 µm, about 5 µm, about 10 µm, about 15 µm, about 20 µm, about 25 µm, about 30 µm, about 35 µm, about 40 µm, about 45 µm, or about 50 µm.

In some embodiments, the anode material 110 can include a first electrolyte and the cathode material 130 can include a second electrolyte. In other words, and the anode material 110 can include an anolyte and the cathode material 130 can include a catholyte. In some embodiments, the electrochemical cell 100 can include an anolyte disposed on the anode side of the separators 150. In some embodiments, the electrochemical cell 100 can include a catholyte disposed on the cathode side of the separators 150. In some embodiments, the electrochemical cell 100 can include a selectively permeable membrane. In some embodiments, the selectively permeable membrane can be disposed between the first separator 150a and the second separator 150b. Electrochemical cells with anolytes, catholytes, and/or selectively permeable membranes are described in U.S. Pat. No. 10,734,672 ("the '672 patent"), filed Jan. 8, 2019, and titled, "Electrochemical Cells Including Selectively Permeable Membranes, Systems and Methods of Manufacturing the Same," the disclosure of which is hereby incorporated by reference in its entirety.

As shown, the first separator 150a is disposed on the anode material 110 while the second separator 150b is disposed on the cathode material 130. In some embodiments, the separators 150 can be disposed on their respective electrodes during production of the electrochemical cell 100. In some embodiments, the first separator 150a and/or the second separator 150b can be composed of polyethylene, polypropylene, high density polyethylene, polyethylene terephthalate, polystyrene, a thermosetting polymer, hard carbon, a thermosetting resin, a polyimide, a ceramic coated separator, an inorganic separator, cellulose, glass fiber, a polyethylenoxide (PEO) polymer in which a lithium salt is complexed to provide lithium conductivity, Nation™ membranes which are proton conductors, or any other suitable separator material, or combinations thereof. In some embodiments, the first separator 150a and/or the second separator 150b can be composed of any of the separator materials described in the '564 application. In some embodiments, the first separator 150a can be composed of the same material as the second separator 150b. In some embodiments, the first separator 150a can be composed of a different material from the second separator 150b. In some embodiments, the first separator 150a and/or the second separator 150b can be absent of any framing members described in the '564 application.

In some embodiments, the first separator 150a and/or the second separator 150b can have a porosity of at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, or at least about 85%. In some embodiments, the first separator 150a and/or the second separator 150b can have a porosity of no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, no more than about 15%, or no more than about 10%.

Combinations of the above-referenced porosity percentages of the first separator 150a and/or the second separator 150b are also possible (e.g., at least about 5% and no more than about 90% or at least about 20% and no more than about 40%), inclusive of all values and ranges therebetween. In some embodiments, the first separator 150a and/or the second separator 150b can have a porosity of about 5%, about 10%, about 15%, about 20%, about 25%, about 30%, about 35%, about 40%, about 45%, about 50%, about 55%, about 60%, about 65%, about 70%, about 75%, about 80%, about 85%, or about 90%.

In some embodiments, the first separator 150a can have a different porosity from the second separator 150b. In some embodiments, the porosities of the first separator 150a and the second separator 150b can be selected based on the difference between the anolyte and the catholyte. For example, if the catholyte has a higher vapor pressure and faster evaporation properties than the anolyte, then the second separator 150b can have a lower porosity than the first separator 150a. The lower porosity of the second separator 150b can at least partially prevent the catholyte from evaporating during production.

In some embodiments, the first separator 150a can be composed of a different material from the second separator 150b. In some embodiments, the materials of the first separator 150a and the second separator 150b can be selected to facilitate wettability of the first separator 150a with the anolyte and the second separator 150b with the catholyte 150. For example, an ethylene carbonate/propylene carbonate-based catholyte can wet a polyethylene separator better than a polyimide separator, based on the molecular properties of the materials. An ethylene carbonate/dimethyl carbonate-based anolyte can wet a polyimide separator better than a polyethylene separator. A full wetting of the first separator 150a and the second separator 150b can give way to better transport of electroactive species via the separators 150. This transport can be facilitated particularly well when the first separator 150a physically contacts the second separator 150b.

In some embodiments, the first separator 150a and/or the second separator 150b can be absent of separator seals (e.g., separator seals described in the '564 application). As shown, the electrochemical cell 100 includes two separators 150. In some embodiments, the electrochemical cell 100 can include 3, 4, 5, 6, 7, 8, 9, 10, or more than about 10 separators 150. In some embodiments, a layer of liquid electrolyte (not shown) can be disposed between the first separator 150a and the second separator 150b. A layer of liquid electrolyte can promote better adhesion between the separators 150.

In some embodiments, the first separator 150a and/or the second separator 150b can have a thickness of at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 20 μm, at least about 30 μm, at least about 40 μm, at least about 50 μm, at least about 60 μm, at least about 70 μm, at least about 80 μm, at least about 90 μm, at least about 100 μm, at least about 110 μm, at least about 120 μm, at least about 130 μm, at least about 140 μm, at least about 150 μm, at least about 160 μm, at least about 170 μm, at least about 180 μm, or at least about 190 μm. In some embodiments, the first separator 150a and/or the second separator 150b can have a thickness of no more than about 200 μm, no more than about 190 μm, no more than about 180 μm, no more than about 170 μm, no more than about 160 μm, no more than about 150 μm, no more than about 140 μm, no more than about 130 μm, no more than about 120 μm, no more than about 110 μm, no more than about 100 μm, no more than about 90 μm, no more than about 80 μm, no more than about 70 μm, no more than about 60 μm, no more than about 50 μm, no more than about 40 μm, no more than about 30 μm, no more than about 20 μm, no more than about 10 μm, no more than about 9 μm, no more than about 8 μm, no more than about 7 μm, no more than about 6 μm, no more than about 5 μm, no more than about 4 μm, no more than about 3 μm, or no more than about 2 μm. Combinations of the above-referenced thicknesses of the first separator 150a and/or the second separator 150b are also possible (e.g., at least about 1 μm and no more than about 200 μm or at least about 50 μm and no more than about 100 μm), inclusive of all values and ranges therebetween. In some embodiments, the first separator 150a and/or the second separator 150b can have a thickness of about 1 μm, about 2 μm, about 3 μm, about 4 μm, about 5 μm, about 6 μm, about 7 μm, about 8 μm, about 9 μm, about 10 μm, about 20 μm, about 30 μm, about 40 μm, about 50 μm, about 60 μm, about 70 μm, about 80 μm, about 90 μm, about 100 μm, about 110 μm, about 120 μm, about 130 μm, about 140 μm, about 150 μm, about 160 μm, about 170 μm, about 180 μm, about 190 μm, or about 200 μm. In some embodiments, the first separator 150a can have a thickness the same or substantially similar to the thickness of the second separator 150b. In some embodiments, the first separator 150a can have a thickness greater or less than a thickness of the second separator 150b.

In some embodiments, the first separator 150a can be coupled to the second separator 150b. In some embodiments, the first separator 150a and/or the second separator 150b can be wetted so as to promote clinging between first separator 150a and the second separator 150b. In other words, the first separator 150a can be held to the second separator 150b via surface tension and/or capillary forces.

In some embodiments, the anode material 110, the anode current collector 120, and the first separator 150a can be packaged in a first container, while the cathode material 130, the cathode current collector 140 and the second separator 150b can be packaged in a second container prior to assembly. In other words, the electrochemical cell 100 can be assembled via an anode kit (including the anode material 110, the anode current collector 120, and the first separator 150a) and a cathode kit (including the cathode material 130, the cathode current collector 140, and the second separator 150b). The anode material 110, the anode current collector 120, and the first separator 150a can be removed from the first container and the cathode material 130, the cathode current collector 140, and the second separator 150b can be removed from the second container. The first separator 150a can then be disposed on the second separator 150b to form the electrochemical cell 100.

Figure 2:
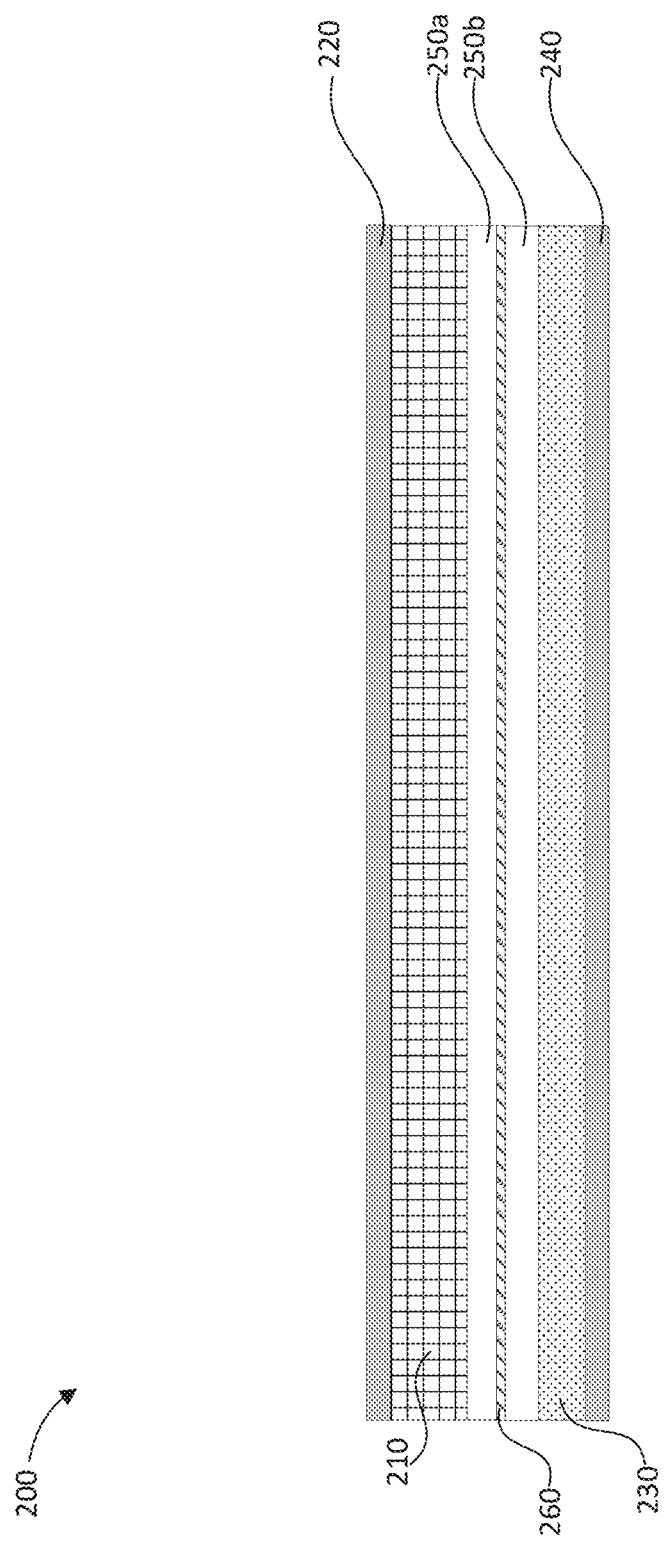
FIG. 2 is an illustration of an electrochemical cell with multiple separators, according to an embodiment.

FIG. 2 shows an illustration of an electrochemical cell 200, according to an embodiment. As shown, the electrochemical cell 200 includes an anode material 210 disposed on an anode current collector 220, a cathode material 230 disposed on a cathode current collector 240, a first separator 250a disposed on the anode material 210, a second separator 250b disposed on the cathode material 230, and an interlayer 260 disposed between the first separator 250a and the second separator 250b. In some embodiments, the anode material 210, the anode current collector 220, the cathode material 230, the cathode current collector 240, the first separator 250a, and the second separator 250b can be the same or substantially similar to the anode material 110, the anode current collector 120, the cathode material 130, the cathode current collector 140, the first separator 150a, and the second separator 150b, as described above with reference to FIG. 1. Thus, certain aspects of the anode material 210, the anode current collector 220, the cathode material 230, the cathode current collector 240, the first separator 250a, and the second separator 250b are not described in greater detail herein.

In some embodiments, the interlayer 260 can include an electrolyte layer. In some embodiments, the electrolyte layer can include a liquid electrolyte. In some embodiments, the electrolyte layer can include a solid-state electrolyte, for example, to prevent dendrite growth. In some embodiments, the electrolyte layer can include polyacrylonitrile (PAN). In some embodiments, the electrolyte layer can partially or fully saturate the first separator 250a and/or the second separator 250b (collectively referred to as the separators 250). In some embodiments, the electrolyte layer can aid in bonding the first separator 250a to the second separator 250b. In some embodiments, the electrolyte layer can create a surface tension to bond the first separator 250a to the second separator 250b. In some embodiments, the electrolyte layer can facilitate movement of electroactive species between the anode material 210 and the cathode material 230.

In some embodiments, the interlayer 260 can have a thickness of at least about 500 nm, at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 20 μm, at least about 30 μm, at least about 40 μm, at least about 50 μm, at least about 60 μm, at least about 70 µm, at least about 80 µm, or at least about 90 µm. In some embodiments, the interlayer 260 can have a thickness of no more than about 100 µm, no more than about 90 µm, no more than about 80 µm, no more than about 70 µm, no more than about 60 µm, no more than about 50 µm, no more than about 40 µm, no more than about 30 µm, no more than about 20 µm, no more than about 10 µm, no more than about 9 µm, no more than about 8 µm, no more than about 7 µm, no more than about 6 µm, no more than about 5 µm, no more than about 4 µm, no more than about 3 µm, no more than about 2 µm, or no more than about 1 µm. Combinations of the above-referenced thicknesses of the interlayer 260 are also possible (e.g., at least about 500 nm and no more than about 100 µm or at least about 2 µm and no more than about 30 µm), inclusive of all values and ranges therebetween. In some embodiments, the interlayer 260 can have a thickness of about 500 nm, about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, or about 100 µm.

In some embodiments, the interlayer 260 can include a semi-solid electrode layer disposed between the first separator 250a and the second separator 250b. In some embodiments, the layer of semi-solid electrode material can be included in addition to the electrolyte layer. In some embodiments, the semi-solid electrode layer between the first separator 250a and the second separator 250b can include a material that reacts with metallic lithium. In some embodiments, the semi-solid electrode layer between the first separator 250a and the second separator 250b can include hard carbon, graphite, or any other suitable electrode material or combinations thereof. In some embodiments, if the anode material 210 begins to form dendrites that penetrate the first separator 250a, the dendritic material can react with the semi-solid electrode layer between the first separator 250a and the second separator 250b, such that the dendrites dissipate, thus preventing a short circuit. In some embodiments, the interlayer 260 may include a single layer. In some embodiments, the interlayer 260 may include a bilayer structure, for example, include a first layer including a semi-solid electrode layer (e.g., a binder-free carbon slurry), and a second layer including a solid state electrolyte (e.g., LLZO, LLTO, LATP, sulfides, polymer gel electrolytes, etc.).

In some embodiments, the semi-solid electrode layer between the first separator 250a and the second separator 250b can aid in transporting electroactive species across the separators 250. The semi-solid electrode layer between the first separator 250a and the second separator 250b can provide reduced tortuosity and better lithium ion diffusion compared to conventional electrode materials. The composition of the semi-solid electrode layer between the first separator 250a and the second separator 250b can be fine-tuned to facilitate ion movement therethrough.

In some embodiments, the semi-solid electrode layer between the first separator 250a and the second separator 250b can have catalytic effects to remove, dissolve, and/or corrode contaminating metal powders (e.g., iron, chromium, nickel, aluminum, copper). In such cases, the semi-solid electrode layer between the first separator 250a and the second separator 250b can serve as a metal contamination removing buffer layer. In some embodiments, the semi-solid electrode layer between the first separator 250a and the second separator 250b can include a non-lithium ion semi-solid slurry with an aligned pore structure, a high surface area, and/or a diffusive structure combined with an electro-lyte. Such materials can include metal-organic frameworks (MOFs), carbon black, an anode aluminum oxide (AAO) template, and/or silica. In such cases, the semi-solid electrode layer between the first separator 250a and the second separator 250b can serve as an electrolyte reservoir and/or an embedding base for a dendrite-removing catalyst. Such materials can also improve current distributions in the electrochemical cell 200. In some embodiments, the dendrite-removing catalyst can include a metal base and/or a polymer base for the facilitation of redox reactions. In some embodiments, the dendrite-removing catalyst can include fluorine, sulfide, or any other suitable catalyst or combinations thereof. In some embodiments, the catalyst can include a base polymer coating mix or a carbon mix.

In some embodiments, the interlayer 260 can include a conventional (i.e., solid) electrode layer can be disposed between the first separator 250a and the second separator 250b. In some embodiments, the conventional electrode layer between the first separator 250a and the second separator 250b can include a binder (e.g., a solid binder or a gel binder).

In some embodiments, the interlayer 260 can include a polyolefin, a solid-state electrolyte sheet, and/or a polymer electrolyte sheet. In some embodiments, the interlayer 260 can include polyacrylonitrile (PAN), poly(vinylidene fluoride-co-hexafluoropropylene) (PVDF-HFP), poly(methyl methacrylate) (PMMA), polyacrylic acid (PAA), polyethylene oxide (PEO), or any combination thereof.

In some embodiments, the interlayer 260 can include a cathode. In some embodiments, the cathode in the interlayer 260 can include lithium titanate (LTO), hard carbon (HC), and/or any other material with a high impedance connection. In some embodiments, the LTO can include an electron-conductive LTO, such as $Li_{4+x}Ti_5O_{12}$ and/or $Li_4Ti_5O_{12-x}$. In some embodiments, the interlayer 260 can include lithium iron phosphate (LFP) with a high impedance connection. The LFP can be considered a safe chemistry for the monitoring of dendrite formation. If a dendrite forms in either of the electrodes and penetrates into the interlayer 260, the dendrite would be consumed. Also, voltage can be monitored between the interlayer 260 and the anode current collector 220, as shown. In some embodiments, voltage can be monitored between the interlayer 260 and the cathode current collector 240. This voltage monitoring can detect if a dendrite has reached the interlayer 260.

Measuring voltage between the interlayer 260 and the anode current collector 220 and/or the cathode current collector 240 can be a more efficient method of detecting defects in the electrochemical cell 200 than measuring across the entire electrochemical cell 200 (i.e., between the anode current collector 220 and the cathode current collector 240), particularly in modules with multiple cells. In some embodiments, multiple electrochemical cells can be connected in parallel and/or series to produce a cell module. For example, if a cell has a capacity of 3 Ah, 50 such cells can be connected in parallel to produce a capacity of 150 Ah. In some embodiments, the module can include about 1, about 2, about 3, about 4, about 5, about 6, about 7, about 8, about 9, about 10, about 11, about 12, about 13, about 14, about 15, about 16, about 17, about 18, about 19, about 20, about 25, about 30, about 35, about 40, about 45, about 50, about 55, about 60, about 65, about 70, about 75, about 80, about 85, about 90, about 95, or about 100 electrochemical cells connected in series and/or parallel, inclusive of all values and ranges therebetween. In monitoring the voltage across the interlayer 260 and the anode current collector 220 and/or the cathode current collector 240, the interlayer 260 can serve as a reference electrode.

In some embodiments, individual electrochemical cell in a module can have a capacity of about 0.5 Ah, about 1 Ah, about 2 Ah, about 3 Ah, about 4 Ah, about 5 Ah, about 6 Ah, about 7 Ah, about 8 Ah, about 9 Ah, or about 10 Ah, inclusive of all values and ranges therebetween. In some embodiments, modules described herein can have a capacity of about 10 Ah, about 20 Ah, about 30 Ah, about 40 Ah, about 50 Ah, about 60 Ah, about 70 Ah, about 80 Ah, about 90 Ah, about 100 Ah, about 110 Ah, about 120 Ah, about 130 Ah, about 140 Ah, about 150 Ah, about 160 Ah, about 170 Ah, about 180 Ah, about 190 Ah, about 200 Ah, about 210 Ah, about 220 Ah, about 230 Ah, about 240 Ah, about 250 Ah, about 260 Ah, about 270 Ah, about 280 Ah, about 290 Ah, or about 300 Ah, inclusive of all values and ranges therebetween.

In existing battery management systems (BMS) and cell modules, the ability to diagnose the health of each electrochemical cell is limited. To monitor the health of each cell, local voltage and/or current measurements are used to discern small changes in cell voltages. Voltage measurements across individual cells offer little direct correlation to the individual cell health. The addition of differential current measurement in the modules adversely affects the total system complexity and the cost of the measurement systems. Conversely, if the voltage between the interlayer 260 and a current collector is measured for each parallel electrochemical cell, the relative difference of that voltage is a direct measure of the relative health (i.e., impedance) of the anode material 210 and/or the cathode material 230 and relative impedance within the electrochemical cell 200 itself. In such an arrangement, it is possible to determine (by direct measurement) if the electrochemical cell 200 is behaving normally relative to other electrochemical cells in a parallel string or pack system. Through mass data collection, trend data from a large collection of electrochemical cells can be used to coordinate the analysis of a group or lot, or individual cell serial numbers relative to the larger cell population.

For extremely large format cells, the added complexity to measure an additional 2-3 differential voltages is lower than the added complexity of adding equivalent high gain current measurement channels, or to add hall effect type sensors, for example. In this way, individual cell health of a parallel cell grouping can be directly measured. Additional diagnostics to remaining cells connected in series can be evaluated based on state-of-charge (SOC) and state-of-health (SOH) algorithms. This allows for early notification of system failures long before faults would normally be detected. This precision can also allow for a prediction of a date of failure and advanced planning. For example, materials can be positioned properly in an electrochemical cell module in anticipation of a failure. Additionally, supply chain issues can be considered before an original equipment manufacturer (OEM) fleet or an individual consumer is notified of a fault. After the voltage measurement between the interlayer 260 and the anode current collector 220 and/or the cathode current collector 240 detects a soft short-circuit, an external short of the cell module can be triggered to discharge.

In some embodiments, the interlayer 260 can prevent dangerous short circuit events from dendrite growth via metal contamination (e.g., iron contamination, zinc contamination, copper contamination) and shuttling by a buffer layer. In such a case, an iron dendrite can grow and touch hard carbon, graphite, and/or other carbon-containing materials in the interlayer 260, with the interlayer 260 having a cathode potential. Once the iron dendrite touches the hard carbon, graphite, and/or the other carbon-containing materials in the interlayer 260, the iron dissolves under the cathode potential, but the high current moving through the electrochemical cell 200 persists via a connection through a diode or high resistance. When metal contamination is used to prevent dangerous short circuit events, voltage can be monitored between the interlayer 260 and the anode current collector 220 and/or the cathode current collector 240 (or between the interlayer 260 and the anode material 210 and/or the cathode material 230). In some embodiments, additional safety actions can be triggered by a BMS if a significant voltage drop (e.g., at least about 0.5 V, at least about 1 V, at least about 1.5 V, at least about 2 V, at least about 2.5 V, at least about 3 V, at least about 3.5 V, at least about 4 V, at least about 4.5 V, at least about 5 V, inclusive of all values and ranges therebetween) is detected. In some embodiments, the interlayer 260 may include a tab to enable coupling with an electrical connection or sensing system external to the electrochemical cell 200. In some embodiments, multiple electrochemical cells can be connected in parallel with a tab connected to the interlayer 260. A diode or high resistance resistor can be connected to many cathodes (e.g., many tabs connected to cathode current collectors 240) and many interlayers (e.g., many tabs connected to interlayers 260).

In some embodiments, the interlayer 260 can prevent dangerous short circuit events from lithium dendrites via lithium intercalation. For example, lithium dendrites can grow and penetrate the first separator 250a or the second separator 250b and contact hard carbon, graphite, and/or a carbon-containing material in the interlayer 260. Once the lithium dendrite contacts the hard carbon, graphite, and/or the carbon-containing material in the interlayer 260, the lithium intercalates into the carbon, graphite, and/or the carbon-containing material. While hard carbon, graphite, and/or any carbon-containing material can facilitate lithium intercalation, any material that reacts with lithium can achieve this lithium intercalation function. In some embodiments, the interlayer 260 can include silicon, aluminum, silver, tungsten, tin, or any combination thereof.

FIG. 3 shows a block diagram of a method 10 of forming an electrochemical cell, according to an embodiment. As shown, the method 10 includes disposing an anode material onto an anode current collector at step 11 and disposing a first separator onto the anode material at step 12. The method 10 optionally includes conveying the anode current collector, the anode material, and the first separator (collectively referred to as "the anode") in step 13. The method 10 further includes disposing a cathode material onto a cathode current collector at step 14 and disposing a second separator onto the cathode material at step 15. The method 10 optionally includes conveying the cathode current collector, the cathode material, and the second separator (collectively referred to as "the cathode") at step 16 and wetting the first separator and/or the second separator at step 17. The method 10 includes coupling the first separator to the second separator at step 18 to form the electrochemical cell.

Step 11 includes disposing the anode material onto the anode current collector. The anode material and the anode current collector can have any of the properties of the anode material 110 and the anode current collector 120 (e.g., thickness, composition) as described above with reference to FIG. 1. In some embodiments, the anode material can be extruded (e.g., via a twin-screw extruder) onto the anode current collector. In some embodiments, the anode material can be dispensed via a nozzle. In some embodiments, the dispensation of the anode material can be via any of the methods described in U.S. provisional application 63/115,293 (hereinafter "the '293 application"), entitled, "Methods of Continuous and Semi-Continuous Production of Electrochemical Cells," filed Nov. 18, 2020, the entirety of which is incorporated herein by reference. In some embodiments, the dispensation of the anode material can be via any of the methods described in U.S. patent publication no. 2020/0014025 (hereinafter "the '025 publication), entitled "Continuous and Semi-Continuous Methods of Semi-Solid Electrode and Battery Manufacturing," filed Jul. 9, 2019, the entirety of which is hereby incorporated by reference.

Step 12 includes disposing the first separator onto the anode material. In some embodiments, the first separator can be pre-soaked or pre-coated with electrolyte solution prior to the disposing. In some embodiments, the first separator can be placed onto the anode material by a machine. In some embodiments, the first separator can be placed onto the anode material via one or more rollers, conveying separator material. In some embodiments, the separator can be placed onto the anode material via any of the methods described in the '293 application and/or the '025 publication.

Step 13 optionally includes conveying the anode. In some embodiments, the conveying can be on a conveyance device, such as a conveyor belt. In some embodiments, the conveying can be through a tunnel to limit evaporation of electrolyte solution from the anode. In some embodiments, the anode can be on the conveyance device for at least about 1 second, at least about 5 seconds, at least about 10 seconds, at least about 20 seconds, at least about 30 seconds, at least about 40 seconds, at least about 50 seconds, at least about 1 minute, at least about 5 minutes, at least about 10 minutes, at least about 20 minutes, at least about 30 minutes, at least about 40 minutes, at least about 50 minutes, at least about 1 hour, at least about 2 hours, at least about 3 hours, at least about 4 hours, at least about 5 hours, at least about 10 hours, at least about 15 hours, or at least about 20 hours. In some embodiments, the anode can be on the conveyance device for no more than about 1 day, no more than about 20 hours, no more than about 15 hours, no more than about 10 hours, no more than about 5 hours, no more than about 4 hours, no more than about 3 hours, no more than about 2 hours, no more than about 1 hour, no more than about 50 minutes, no more than about 40 minutes, no more than about 30 minutes, no more than about 20 minutes, no more than about 10 minutes, no more than about 5 minutes, no more than about 4 minutes, no more than about 3 minutes, no more than about 2 minutes, no more than about 1 minute, no more than about 50 seconds, no more than about 40 seconds, no more than about 30 seconds, no more than about 20 seconds, no more than about 10 seconds, or no more than about 5 seconds.

Combinations of the above-referenced time periods the anode remains on the conveyance device are also possible (e.g., at least about 1 second and no more than about 1 day or at least about 5 minutes and no more than about 2 hours), inclusive of all values and ranges therebetween. In some embodiments, the anode can be on the conveyance device for about 1 second, about 5 seconds, about 10 seconds, about 20 seconds, about 30 seconds, about 40 seconds, about 50 seconds, about 1 minute, about 5 minutes, about 10 minutes, about 20 minutes, about 30 minutes, about 40 minutes, about 50 minutes, about 1 hour, about 2 hours, about 3 hours, about 4 hours, about 5 hours, about 10 hours, about 15 hours, about 20 hours, or about 1 day.

In some embodiments, the anode can be conveyed a distance of at least about 1 cm, at least about 2 cm, at least about 3 cm, at least about 4 cm, at least about 5 cm, at least about 10 cm, at least about 20 cm, at least about 30 cm, at least about 40 cm, at least about 50 cm, at least about 60 cm, at least about 70 cm, at least about 80 cm, at least about 90 cm, at least about 1 m, at least about 2 m, at least about 3 m, at least about 4 m, at least about 5 m, at least about 6 m, at least about 7 m, at least about 8 m, at least about 9 m, at least about 10 m, at least about 20 m, at least about 30 m, at least about 40 m, at least about 50 m, at least about 60 m, at least about 70 m, at least about 80 m, or at least about 90 m. In some embodiments, the anode can be conveyed a distance of no more than about 100 m, no more than about 90 m, no more than about 80 m, no more than about 70 m, no more than about 60 m, no more than about 50 m, no more than about 40 m, no more than about 30 m, no more than about 20 m, no more than about 10 m, no more than about 9 m, no more than about 8 m, no more than about 7 m, no more than about 6 m, no more than about 5 m, no more than about 4 m, no more than about 3 m, no more than about 2 m, no more than about 1 m, no more than about 90 cm, no more than about 80 cm, no more than about 70 cm, no more than about 60 cm, no more than about 50 cm, no more than about 40 cm, no more than about 30 cm, no more than about 20 cm, no more than about 10 cm, no more than about 9 cm, no more than about 8 cm, no more than about 7 cm, no more than about 6 cm, no more than about 5 cm, no more than about 4 cm, no more than about 3 cm, or no more than about 2 cm. Combinations of the above-referenced conveyance distances are also possible (e.g., at least about 1 cm and no more than about 100 m or at least about 50 cm and no more than about 20 m), inclusive of all values and ranges therebetween. In some embodiments, the anode can be conveyed about 1 cm, about 2 cm, about 3 cm, about 4 cm, about 5 cm, about 10 cm, about 20 cm, about 30 cm, about 40 cm, about 50 cm, about 60 cm, about 70 cm, about 80 cm, about 90 cm, about 1 m, about 2 m, about 3 m, about 4 m, about 5 m, about 6 m, about 7 m, about 8 m, about 9 m, about 10 m, about 20 m, about 30 m, about 40 m, about 50 m, about 60 m, about 70 m, about 80 m, about 90 m, or about 100 m.

The separator coating the anode material can prevent electrolyte from evaporating during conveyance or other portions of the production process. By covering the surface of the anode material distal to the anode current collector a significant percentage of the surface of the anode material (e.g., 90-95%) is not exposed to the surrounding environment. Thus, a significant portion of the avenues for evaporation are restricted.

Step 14 includes disposing the cathode material onto the cathode current collector. In some embodiments, the dispensation of the cathode material can have the same or substantially similar properties to those described above with reference to the anode material in step 11. Step 15 includes disposing the second separator onto the cathode material. In some embodiments, the disposal of the second separator onto the cathode material can have the same or substantially similar properties to those described above with reference to the first separator in step 12.

Step 16 optionally includes conveying the cathode. In some embodiments, the duration and distance of the conveying of the cathode can be the same or substantially similar to the duration and distance of the conveying of the anode with reference to step 13. In some embodiments, the cathode can be conveyed on the same conveyor as the anode. In some embodiments, the anode can be conveyed on a first conveyor and the cathode can be conveyed on a second conveyor, the second conveyor different from the first conveyor.

Step 17 optionally includes wetting the first separator and/or the second separator. The wetting can be via a wetting agent. In some embodiments, the wetting agent can include an electrolyte solvent without electrolyte salt. In some embodiments, the wetting agent can include an electrolyte solution. In some embodiments, the wetting agent can include a diluted electrolyte solution (i.e., an electrolyte solution with a salt concentration lower than the targeted salt concentration in the finished electrochemical cell). In some embodiments, the wetting agent can have an electrolyte salt concentration of at least about 0.1 M, at least about 0.2 M, at least about 0.3 M, at least about 0.4 M, at least about 0.5 M, at least about 0.6 M, at least about 0.7 M, at least about 0.8 M, or at least about 0.9 M. In some embodiments, the wetting agent can have an electrolyte salt concentration of no more than about 1 M, no more than about 0.9 M, no more than about 0.8 M, no more than about 0.7 M, no more than about 0.6 M, no more than about 0.5 M, no more than about 0.4 M, no more than about 0.3 M, no more than about 0.2 M. Combinations of the above-referenced concentrations of electrolyte salt in the wetting agent are also possible (e.g., at least about 0.1 M and no more than about 1 M or at least about 0.4 M and no more than about 0.6 M), inclusive of all values and ranges therebetween. In some embodiments, the wetting agent can have an electrolyte salt concentration of about 0.1 M, about 0.2 M, about 0.3 M, about 0.4 M, about 0.5 M, about 0.6 M, about 0.7 M, about 0.8 M, about 0.9 M, or about 1 M.

In some embodiments, the electrolyte solvent can include ethyl methyl carbonate (EMC), ethylene carbonate (EC), propylene carbonate (PC), dimethyl carbonate (DMC), butylene carbonate, and their chlorinated or fluorinated derivatives, and/or a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. In some embodiments, the electrolyte solvent can include gamma-Butyrolactone (GBL), dimethoxyethane, tetrahydrofuran, 2-methyl tetrahydrofuran, 1,3-dioxolane, 1,4-dioxane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, monoglyme, dioxane, or any other suitable electrolyte solvent. In some embodiments, the electrolyte salt can include $LiClO_4$, $LiPF_6$, $LiBF_4$, LiTFSI, LiBETI, LiBOB, Lithium difluoro(oxalato)borate (LIODFB), Lithium bis(fluorosulfonyl)imide (LiFSI), or any other appropriate electrolyte salt.

In some embodiments, the wetting agent can be sprayed onto the first separator and/or the second separator. In some embodiments, the wetting agent can be brushed onto the first separator and/or the separator. In some embodiments, the wetting agent can be applied to the first separator via a first method and the second separator via a second method, the second method different from the first method. In some embodiments, the wetting agent can aid in adhering the separators to their respective electrode materials.

In some embodiments, less than about 20%, less than about 19%, less than about 18%, less than about 17%, less than about 16%, less than about 15%, less than about 14%, less than about 13%, less than about 12%, less than about 11%, less than about 10%, less than about 9%, less than about 8%, less than about 7%, less than about 6%, less than about 5%, less than about 4%, less than about 3%, less than about 2%, or less than about 1% by volume of the wetting agent can be lost to evaporation during execution of the method 10.

In some embodiments, less than about 20%, less than about 19%, less than about 18%, less than about 17%, less than about 16%, less than about 15%, less than about 14%, less than about 13%, less than about 12%, less than about 11%, less than about 10%, less than about 9%, less than about 8%, less than about 7%, less than about 6%, less than about 5%, less than about 4%, less than about 3%, less than about 2%, or less than about 1% by volume of the electrolyte solution in the anode material can be lost to evaporation during execution of the method.

In some embodiments, less than about 20%, less than about 19%, less than about 18%, less than about 17%, less than about 16%, less than about 15%, less than about 14%, less than about 13%, less than about 12%, less than about 11%, less than about 10%, less than about 9%, less than about 8%, less than about 7%, less than about 6%, less than about 5%, less than about 4%, less than about 3%, less than about 2%, or less than about 1% by volume of the electrolyte solution in the cathode material can be lost to evaporation during execution of the method.

In some embodiments, less than about 20%, less than about 19%, less than about 18%, less than about 17%, less than about 16%, less than about 15%, less than about 14%, less than about 13%, less than about 12%, less than about 11%, less than about 10%, less than about 9%, less than about 8%, less than about 7%, less than about 6%, less than about 5%, less than about 4%, less than about 3%, less than about 2%, or less than about 1% by volume of the combination of the electrolyte solution in the anode material, the electrolyte solution in the cathode material, and the wetting agent can be lost to evaporation during execution of the method.

In some embodiments, the anode material, the anode current collector, and the first separator can be disposed in a first package as an anode kit. In some embodiments, the cathode material, the cathode current collector, and the second separator can be disposed in a second package as a cathode kit. In some embodiments, the first separator can be wetted prior to disposal in the first package. In some embodiments, the second separator can be wetted prior to disposal in the second package.

Step 18 includes coupling the first separator to the second separator to form the electrochemical cell. In some embodiments, the coupling can include adhering the first separator to the second separator. In some embodiments, the first separator and/or the second separator can be wetted to facilitate the adhering of the first separator to the second separator. In some embodiments, the anode material, the anode current collector, and the first separator can be removed from the first package prior to coupling the first separator to the second separator to form the electrochemical cell. In some embodiments, the cathode material, the cathode current collector, and the second separator can be removed from the second package prior to coupling the first separator to the second separator. In some embodiments, a semi-solid electrode material can be applied to the first separator and/or the second separator prior to coupling the first separator to the second separator, such that the semi-solid electrode material is disposed between the first separator and the second separator in the electrochemical cell. In some embodiments, a conventional electrode material can be applied to the first separator and/or the second separator prior to coupling the first separator to the second separator, such that the conventional electrode material is disposed between the first separator and the second separator in the electrochemical cell. In some embodiments, a solid-state electrolyte material can be applied to the first separator and/or the second separator prior to coupling the first separator to the second separator, such that the solid-state electrolyte material is disposed between the first separator and the second separator in the electrochemical cell.

Figure 4A:
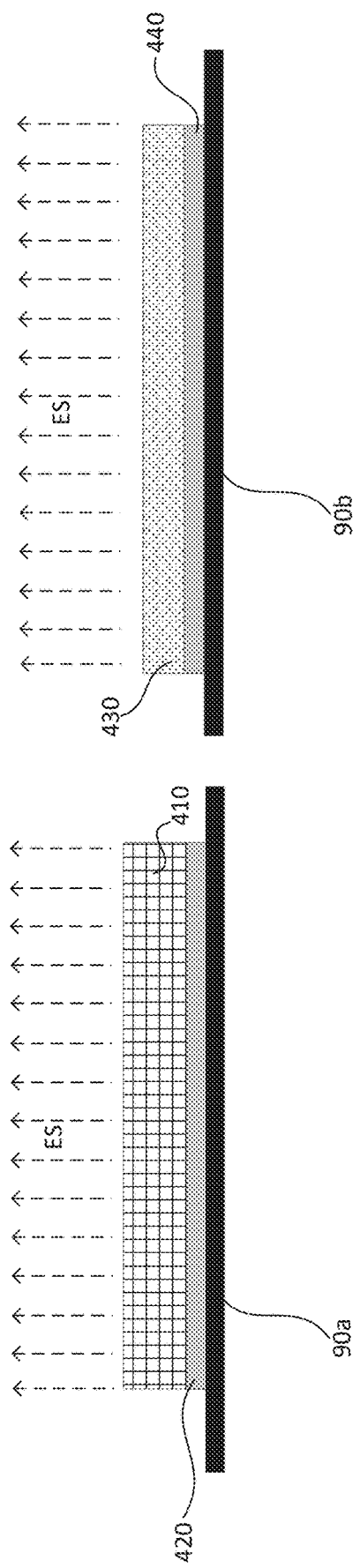
Figure 4B:
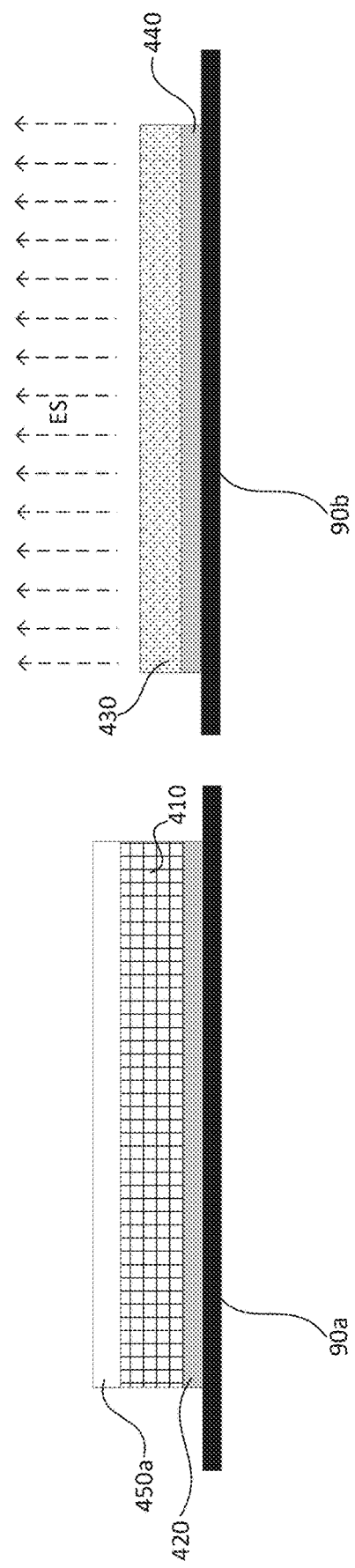

FIGS. 4A-4C show conveyance of electrodes, according to various embodiments. FIGS. 4A-4C show an anode material 410 disposed on an anode current collector 420 and being conveyed by a first conveyor 90a, and a cathode material 430 disposed on a cathode current collector 440 and being conveyed by a second conveyor 90b. FIG. 4A shows the electrodes without any separators disposed thereon. As shown in FIG. 4A, electrolyte solvent ES evaporates from both of the electrodes. FIG. 4B shows a first separator 450a disposed on the anode material 410. As shown in FIG. 4B, electrolyte solvent ES evaporates from the cathode material 430 but evaporation of electrolyte solvent ES from the anode material 410 is eliminated or significantly reduced. FIG. 4B shows the first separator 450a disposed on the anode material 410 and a second separator 450b disposed on the cathode material 430. As shown in FIG. 4C, evaporation of electrolyte solvent ES from both the anode material 410 and the cathode material 430 is eliminated or significantly reduced. As shown, the first conveyor 90a is a separate conveyor from the second conveyor 90b. In some embodiments, the anode material 410, the anode current collector 420, the cathode material 430, and the cathode current collector 440 can all be conveyed on the same conveyor.

Figure 5:
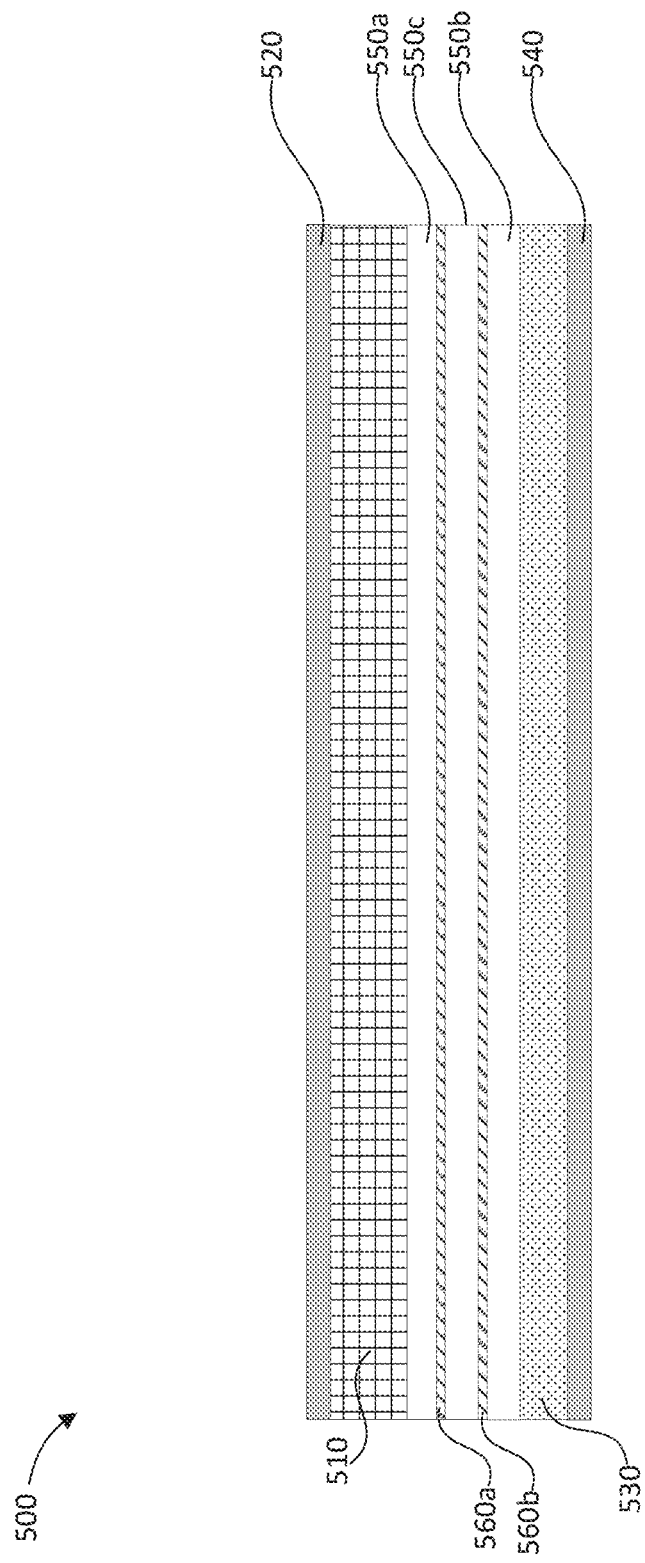
FIG. 5 is an illustration of an electrochemical cell with multiple separators, according to an embodiment.

FIG. 5 shows an illustration of an electrochemical cell 500, according to an embodiment. The electrochemical cell 500 is substantially similar to the electrochemical cell 200, and includes an anode material 510 disposed on an anode current collector 520, a cathode material 530 disposed on a cathode current collector 540, a first separator 550a disposed on the anode material 510, and a second separator 550b disposed on the cathode material 530, which can be substantially similar to the anode material 210, the anode current collector 220, the cathode material 230, the cathode current collector 240, the first separator 250a, and the second separator 250b, respectively, as previously described herein with respect to the electrochemical cell 200.

However, different from electrochemical cell 200, the electrochemical cell 500 also includes a third separator 550c disposed between the first separator 550a and the second separator 550b. A first interlayer 560a is disposed between the first separator 550a and the third separator 550c, and a second interlayer 560b is disposed between the second separator 550b and the third separator 550c. The third separator 550c may be substantially similar to the first separator 250a and/or the second separator 250b as described in detail with respect to the electrochemical cell 200.

In some embodiments, the first interlayer 560a and/or the second interlayer 560b can include an electrolyte layer, as described in detail with respect to FIG. 2. In some embodiments, the electrolyte layer can partially or fully saturate the first separator 550a, the second separator 550b, and or the third separator 550 (collectively referred to as the separators 550). In some embodiments, the electrolyte layer can aid in bonding the first separator 550a and second separator 550b to the third separator 550c. In some embodiments, the electrolyte layer can create a surface tension to bond the first separator 550a and the second separator 550b to the third separator 550c. In some embodiments, the electrolyte layer can facilitate movement of electroactive species between the anode material 510 and the cathode material 530.

In some embodiments, the first interlayer 560a and/or the second interlayer 560b can have any thickness as described in detail with respect to the interlayer 260 of the electrochemical cell 200. In some embodiments, the first interlayer 560a and the second interlayer can include a semi-solid electrode layer disposed between the first separator 550a and third separator 550c, and the second separator 550b and the third separator 550c, respectively. In some embodiments, the layer of semi-solid electrode material can be included in addition to the electrolyte layer. In some embodiments, the semi-solid electrode layer between the first separator 550a and the third separator 550c, and/or between the second separator 550b and the third separator 550c can include a material that reacts with metallic lithium. In some embodiments, the semi-solid electrode layer between the first separator 550a and the third separator 550c, and/or between the second separator 550b and the third separator 550c can include hard carbon, graphite, or any other suitable electrode material or combinations thereof. In some embodiments, if the anode material 510 begins to form dendrites that penetrate the first separator 550a, the dendritic material can react with the semi-solid electrode layer between the first separator 550a and the third separator 550b, such that the dendrites dissipate, thus preventing a short circuit. In some embodiments, one or more of the first separator 550a, the second separator 550b, and the third separator 550c may include solid-state electrolyte sheets.

In some embodiments, the semi-solid electrode layer can aid in transporting electroactive species across the separators 550, and/or provide reduced tortuosity and better lithium ion diffusion compared to conventional electrode materials. The composition of the semi-solid electrode layer(s) can be fine-tuned to facilitate ion movement therethrough. In some embodiments, the semi-solid electrode layer between the first separator 550a and third separator 550c, and/or between the second separator 550b and the third separator 550c can have catalytic effects to remove, dissolve, and/or corrode contaminating metal powders (e.g., iron, chromium, nickel, aluminum, copper). In such cases, the semi-solid electrode layer(s) can serve as a metal contamination removing buffer layer. In some embodiments, the semi-solid electrode layer(s) can include a non-lithium ion semi-solid slurry with an aligned pore structure, a high surface area, and/or a diffusive structure combined with an electrolyte. Such materials can include metal-organic frameworks (MOFs), carbon black, an anode aluminum oxide (AAO) template, and/or silica. In such cases, the semi-solid electrode layer(s) can serve as an electrolyte reservoir and/or an embedding base for a dendrite-removing catalyst. Such materials can also improve current distributions in the electrochemical cell 250. In some embodiments, the dendrite-removing catalyst can include a metal base and/or a polymer base for the facilitation of redox reactions. In some embodiments, the dendrite-removing catalyst can include fluorine, sulfide, or any other suitable catalyst or combinations thereof. In some embodiments, the catalyst can include a base polymer coating mix or a carbon mix.

In some embodiments, the interlayers 560a and/or 560b can include a conventional (i.e., solid) electrode layer disposed between the first separator 550a and the third separator 550c, and/or the second separator 550b and the third separator 550c, respectively. In some embodiments, the conventional electrode layer between the respective separators 550 can include a binder (e.g., a solid binder or a gel binder).

In some embodiments, the interlayers 560a and/or 560b can include a polyolefin, a solid-state electrolyte sheet, and/or a polymer electrolyte sheet. In some embodiments, the interlayers 560a and/or 560b can include polyacrylonitrile (PAN), poly(vinylidene fluoride-co-hexafluoropropylene) (PVDF-HFP), poly(methyl methacrylate) (PMMA), polyacrylic acid (PAA), polyethylene oxide (PEO), or any combination thereof.

In some embodiments, the interlayers 560a and/or 560b can include a cathode. In some embodiments, the cathode in the interlayers 560a and/or 560b can include lithium titanate (LTO), hard carbon (HC), and/or any other material with a high impedance connection. In some embodiments, the LTO can include an electron-conductive LTO, such as $Li_{4+x}Ti_5O_{12}$ and/or $Li_4Ti_5O_{12-x}$. In some embodiments, the interlayers 560a and/or 560b can include lithium iron phosphate (LFP) with a high impedance connection. The LFP can be considered a safe chemistry for the monitoring of dendrite formation. If a dendrite forms in either of the electrodes and penetrates into the interlayers 560a and/or 560b, the dendrite would be consumed. Also, voltage can be monitored between the first interlayer 560a and the anode current collector 520, as shown. In some embodiments, voltage can be monitored between the second interlayer 560b and the cathode current collector 540. This voltage monitoring can detect if a dendrite has reached the interlayers 560a and/or 560b.

Measuring voltage between the first interlayer 560a and the anode current collector 520 and/or the second interlayer 560b and the cathode current collector 540 can be a more efficient method of detecting defects in the electrochemical cell 500 than measuring across the entire electrochemical cell 500 (i.e., between the anode current collector 520 and the cathode current collector 540), particularly in modules with multiple cells. In some embodiments, multiple electrochemical cells can be connected in parallel and/or series to produce a cell module. For example, if a cell has a capacity of 3 Ah, 50 such cells can be connected in parallel to produce a capacity of 150 Ah. In some embodiments, the module can include about 1, about 2, about 3, about 4, about 5, about 6, about 7, about 8, about 9, about 10, about 11, about 12, about 13, about 14, about 15, about 16, about 17, about 18, about 19, about 20, about 25, about 30, about 35, about 40, about 45, about 50, about 55, about 60, about 65, about 70, about 75, about 80, about 85, about 90, about 95, or about 100 electrochemical cells connected in series and/or parallel, inclusive of all values and ranges therebetween. In monitoring the voltage across the first interlayer 560a and the anode current collector 520 and/or the second interlayer 560b and the cathode current collector 540, the first interlayer 560a and/or the second interlayer 560b can serve as a reference electrode.

In some embodiments, individual electrochemical cell in a module can have a capacity of about 0.5 Ah, about 1 Ah, about 2 Ah, about 3 Ah, about 4 Ah, about 5 Ah, about 6 Ah, about 7 Ah, about 8 Ah, about 9 Ah, or about 10 Ah, inclusive of all values and ranges therebetween. In some embodiments, modules described herein can have a capacity of about 10 Ah, about 20 Ah, about 30 Ah, about 40 Ah, about 50 Ah, about 60 Ah, about 70 Ah, about 80 Ah, about 90 Ah, about 100 Ah, about 110 Ah, about 120 Ah, about 130 Ah, about 140 Ah, about 150 Ah, about 160 Ah, about 170 Ah, about 180 Ah, about 190 Ah, about 200 Ah, about 210 Ah, about 220 Ah, about 230 Ah, about 240 Ah, about 250 Ah, about 260 Ah, about 270 Ah, about 280 Ah, about 290 Ah, or about 300 Ah, inclusive of all values and ranges therebetween.

In some embodiments, only one of the first interlayer 560a and the second interlayer 560b may be connected or coupled to an electrical source or sink. For example, in some embodiments, the first interlayer 560a (e.g., a graphite layer, a hard carbon layer, or any other material described herein) may not be connected with cathode, neutral, or ground, while the second interlayer 560b (e.g., a graphite layer, a hard carbon layer, or any other material described herein) may be coupled or connected to a cathode or neutral (e.g., via a diode or high resistance). In some embodiments, a current collector of any other layer may extend between the first separator 550a and the second separator 550b to serve as the third separator 550c, any may be employed as a shutdown separator. In some embodiments, the current collector of the other layer may be formed from aluminum, gold, platinum, stainless steel, titanium foil, conductive ink, etc. In some embodiments, the current collector may be formed or processed by lamination, printing (e.g., inkjet printing, gravure printing, screen printing, etc.), sputtering, spray coating, or deposition, or any other suitable method on the separator or any other suitable method. In some embodiments, a tab may be coupled to the current collector that forms one of the interlayers 560a/b, or directly to the interlayer 560a or 560b that does include a current collector (e.g., a graphite or hard carbon layer). In other embodiments, the tab may be formed monolithically with the current collector or otherwise interlayer 560 having a portion thereof disposed outside the electrochemical cell 500.

Figure 6:
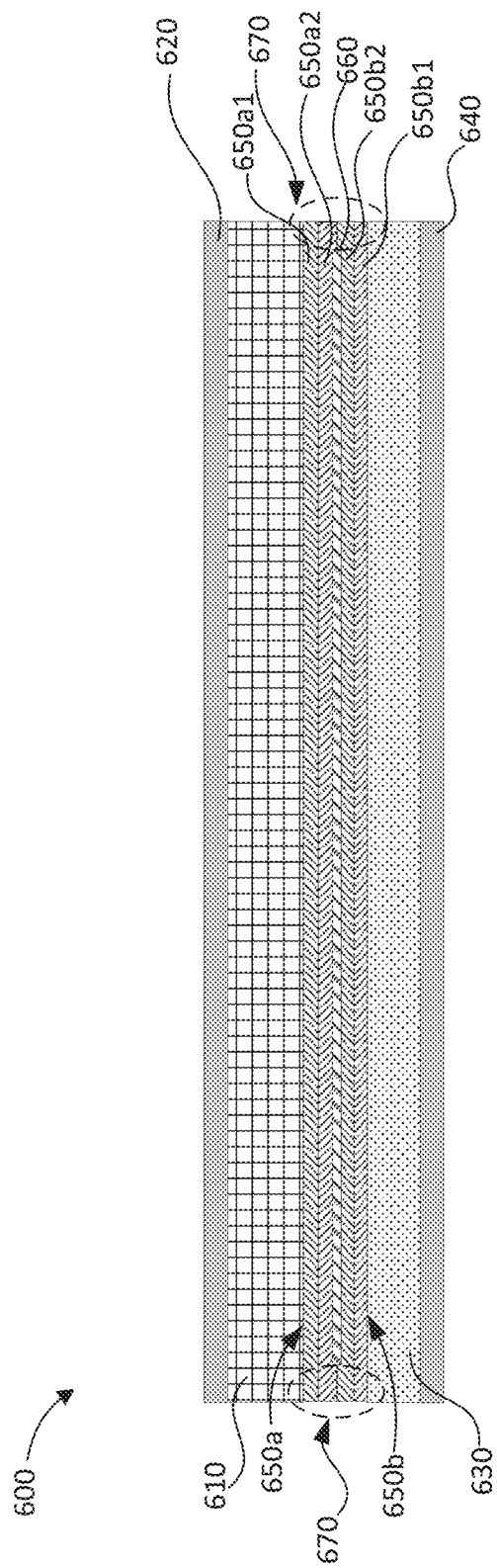
FIG. 6 is an illustration of an electrochemical cell with multiple separators, according to an embodiment.

FIG. 6 shows an illustration of an electrochemical cell 600, according to an embodiment. The electrochemical cell 600 is substantially similar to the electrochemical cell 200, and includes an anode material 610 disposed on an anode current collector 620, a cathode material 630 disposed on a cathode current collector 640, a first separator 650a disposed on the anode material 610, a second separator 650b disposed on the cathode material 630, and an interlayer 660 disposed between the first separator 650a and the second separator 650b. In some embodiments, the anode material 610, the anode current collector 620, the cathode material 630, the cathode current collector 640, and the interlayer 660 can be the same or substantially similar to the anode material 210, the anode current collector 220, the cathode material 230, the cathode current collector 240, and the interlayer 260, as described above with reference to FIG. 2. Thus, certain aspects of the anode material 610, the anode current collector 620, the cathode material 630, the cathode current collector 640, and the interlayer 660 are not described in greater detail herein.

Different from the electrochemical cell 200, the first separator 650a and/or the second separator 650b may include multiple layers. For example, as shown in FIG. 6, the first separator 650a includes a first separator first layer 650a1 and a first separator second layer 650a2 that are formed from different materials (e.g., any of the materials described with respect to the separators 260a and 260b). Similarly, the second separator 650b includes a second separator first layer 650b1 and a second separator second layer 650b2 that are formed from different materials (e.g., any of the materials described with respect to the separators 260a and 260b). The first separator second layer 650a2 and the second separator second layer 650b2 is disposed proximate to the interlayer 660 such that the interlayer 660 is interposed between the first separator second layer 650a2 and the second separator second layer 650b2. The interlayer 660 may include a semisolid interlayer, may include a binder, or may include any other interlayer as described with respect to the interlayer 260. In some embodiments, the first separator first layer 650a1 and the second separator first layer 650b1 may be formed from polypropylene. In some embodiments, the first separator second layer 650a2 and the second separator second layer 650b2 may be formed from polyethylene. In other embodiments, the first separator first and/or second layers 650a1 and 650a2, and/or the second separator first and second layers 650b1 and/or 650b2 may be formed from any other material as described herein. In some embodiments, axial end regions 670 of the first separator 650a and/or the second separator 650b that extend beyond an axial extent of the interlayer 660 may be bonded, adhered, welded, or otherwise coupled to each other so as to form a sealed pocket or cavity within which the interlayer 660 is disposed. This may advantageously prevent a semisolid or slurry based interlayer 660 from leaking from between the first separator 650a and the second separator 650b.

Figure 7:
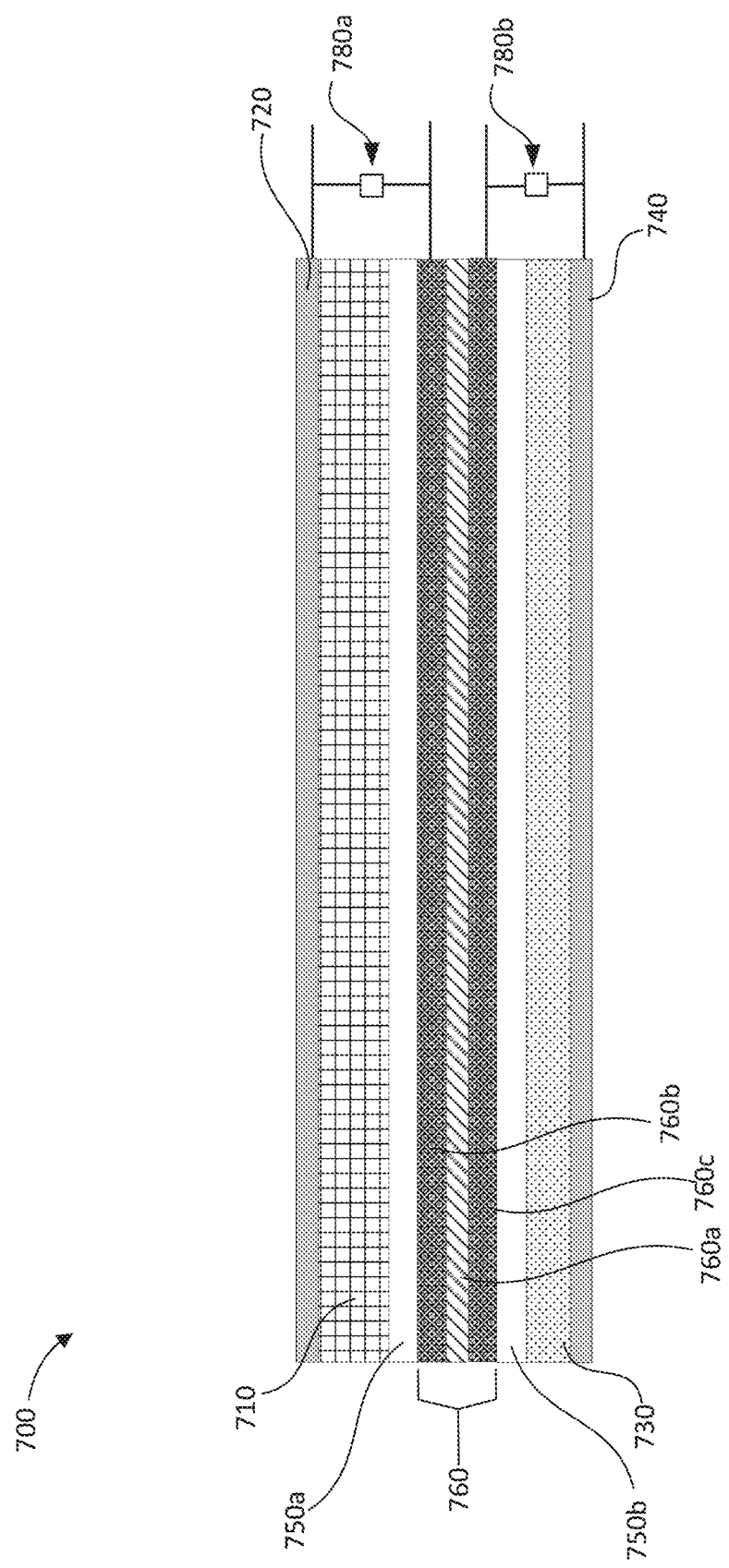
FIG. 7 is an illustration of an electrochemical cell with multiple separators, according to an embodiment.

FIG. 7 shows an illustration of an electrochemical cell 700, according to an embodiment. The electrochemical cell 700 is substantially similar to the electrochemical cell 200, and includes an anode material 710 disposed on an anode current collector 720, a cathode material 730 disposed on a cathode current collector 740, a first separator 750a disposed on the anode material 710, a second separator 750b disposed on the cathode material 730, and an interlayer 760 disposed between the first separator 750a and the second separator 750b. In some embodiments, the anode material 710, the anode current collector 720, the cathode material 730, the cathode current collector 740, the first separator 750a and the second separator 750b can be the same or substantially similar to the anode material 210, the anode current collector 220, the cathode material 230, the cathode current collector 240, the first current collector 250a, and the second collector 250b, as described above with reference to FIG. 2. Thus, certain aspects of the anode material 710, the anode current collector 720, the cathode material 730, the cathode current collector 740, the first separator 750a, and the second separator 750b are not described in greater detail herein.

In some embodiment, the interlayer 760 is a multilayer structure. For example, as shown in FIG. 7, the interlayer 760 includes a first layer 760a that may include a solid-state electrolyte, for example, any of the solid-state electrolytes as described with respect to FIG. 2. The interlayer 760 may optionally, also include a second layer 760b disposed between the first layer 760a and the first separator 750a, and a third layer 760c disposed between the first layer 760a and the second separator 750b. In some embodiments, the second layer 760b and/or the third layer 760c may include a cathode, for example, LTO, hard carbon, LFP, and/or any other material with a high impedance connection, as described in detail with respect to FIG. 2. For example, the second layer 760b may include hard carbon, and the third layer 760c may include LFP. The second layer 760b may be coupled to the anode current collector 720 via a first discharge protection component 780a (e.g., a diode, a high resistance resistor, or any other suitable structure) and the third layer 760c may be coupled to the cathode current collector 740 via a second discharge protection component 780b (e.g., a diode, a high resistance resistor, or any other suitable structure). As previously described, an iron dendrite can grow and touch hard carbon, graphite, and/or other carbon-containing materials in the interlayer 760, with the interlayer 760 having an anode potential in the second layer 760b and a cathode potential in the third layer 760c. Once the iron dendrite touches the hard carbon, graphite, and/or the other carbon-containing materials in the interlayer 760, the iron dissolves under the cathode potential, but the high current moving through the electrochemical cell 700 persists via a connection through the discharge protection components 780a and 780b. When metal contamination is used to prevent dangerous short circuit events, voltage can be monitored between the interlayer 760 and the anode current collector 720 and/or the cathode current collector 740, as described with respect to FIG. 2.

Examples

Comparative Example 1: A lithium-copper cell was constructed (referred to herein as "Comp Ex 1"). Lithium was plated onto copper foil. The cell was cycled at 1 mA/cm$^2$ for 1 hour at 25° C. under a pressure of 200 psig. Stripping of the copper foil continued until a 1V cut-off was reached. A standard separator including a single layer (i.e., a single separator) was placed between the lithium foil anode and the copper foil cathode.

Example 1: A lithium-copper cell was constructed (referred to herein as "Ex 1"). Lithium was plated onto copper foil. The cell was cycled at 1 mA/cm$^2$ for 1 hour at 25° C. under a pressure of 200 psig. Stripping of the copper foil continued until a 1V cut-off was reached. A separator coated with a layer of hard carbon (Kuraray HC, 2-3 µm) was coupled to a standard separator and placed between the lithium foil anode and the copper foil cathode, the hard carbon layer facing the anode. The hard carbon coated separator was implemented as a means of lithiating and/or complexing with any dendritic lithium that protrudes from the lithium foil surface, enabling a safety feature to prevent a hard short from lithium plating on the anode.

Figure 8A:
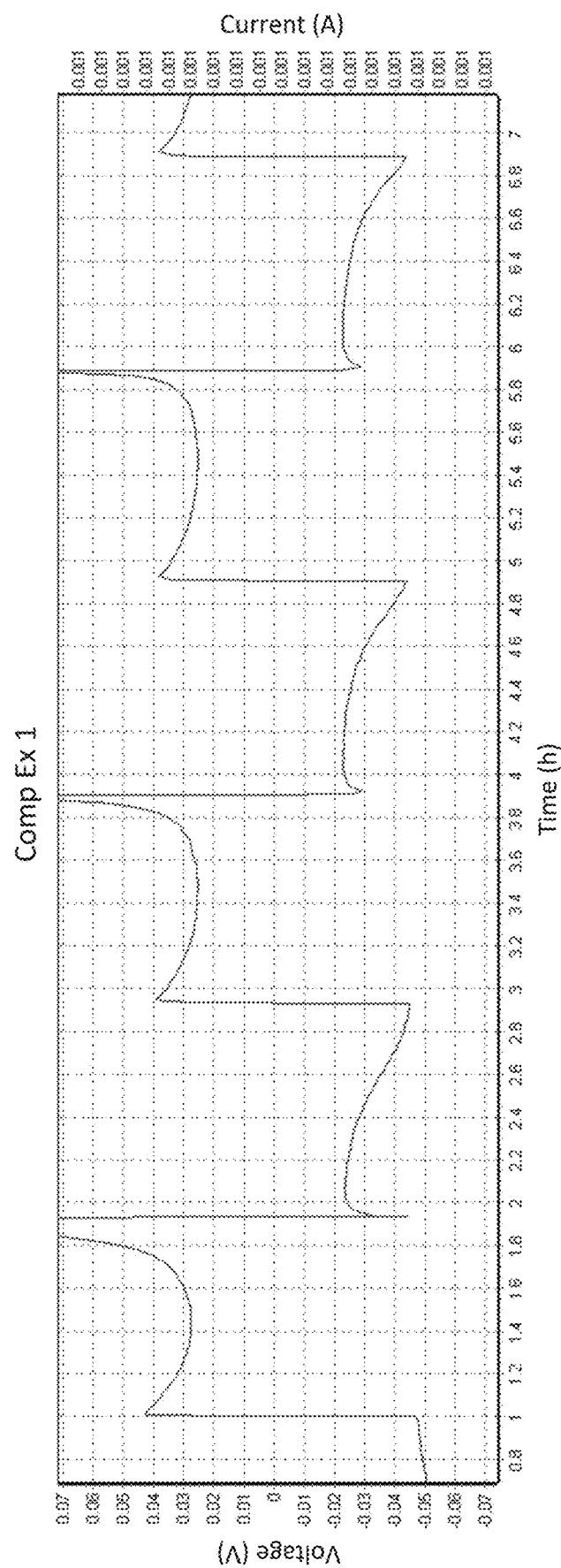
FIGS. 8A-8B show a comparison between a control electrochemical cell with a single separator and an electrochemical cell with two separators and a layer of hard carbon disposed therebetween.
Figure 8B:
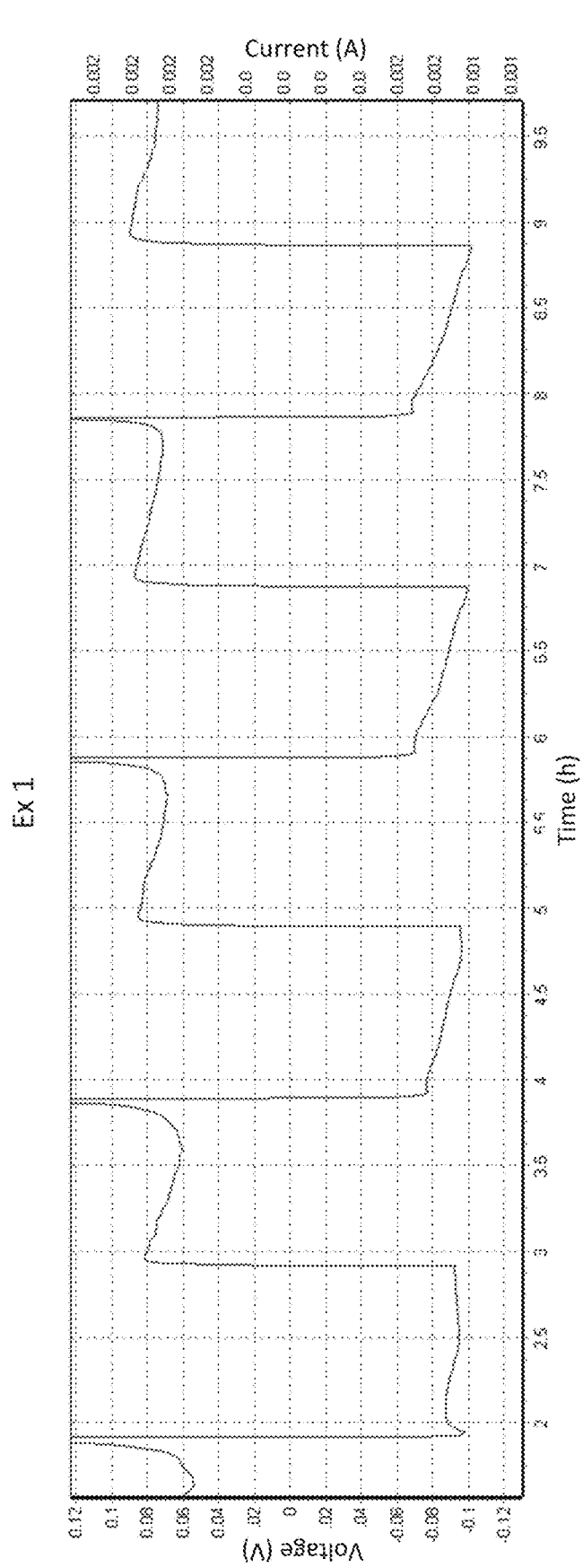

Both Comp Ex 1 and Ex 1 were subject to 32 cycles before deconstruction, where lithium was stripped from the copper foil, allowing lithium to complex with the hard carbon in the Ex 1 cell. The hard carbon in the active area of lithium appeared shiny, indicating lithiation of the hard carbon. The hard carbon that was outside of the lithium foil contact area was dull in color, suggesting it was unlithiated. The cycled lithium foil anode also appeared pristine in nature, indicating the lithium was being plated on the hard carbon. No mossy or dendritic lithium was observed on the foil. FIG. 8A-8B show supporting voltage profiles highlighting the difference in overpotential of Comp Ex 1 (FIG. 8A) vs. Ex 1 (FIG. 8B). As shown, Ex 1 with a hard carbon layer between two separators, experiences less significant overpotential losses than Comp Ex 1.

Comparative Example 2: A lithium copper cell was constructed (referred to herein as "Comp. Ex. 2") and operated similar to Comp. Ex. 1, except that Comp. Ex. 2 was cycled at 7.5 mA/cm$^2$ with 75% lithium ion usage.

Figure 9A:
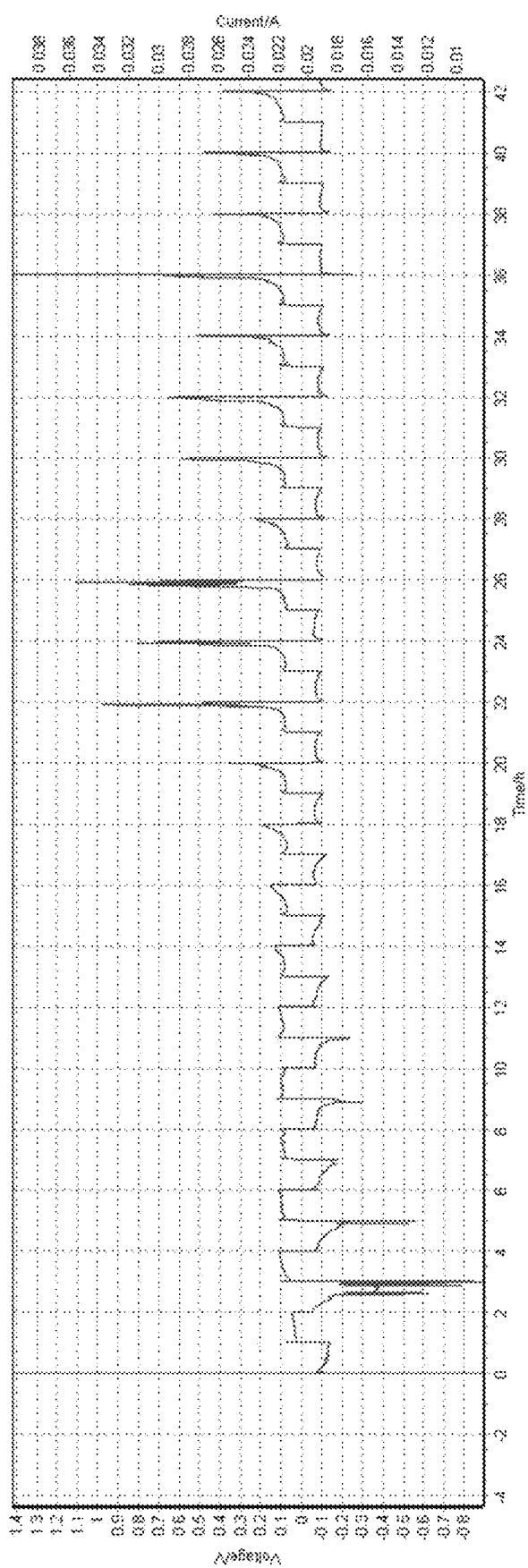
FIGS. 9A-9B show a comparison between a control electrochemical cell with a single separator and an electrochemical cell with two separators and a layer of hard carbon disposed therebetween.
Figure 9B:
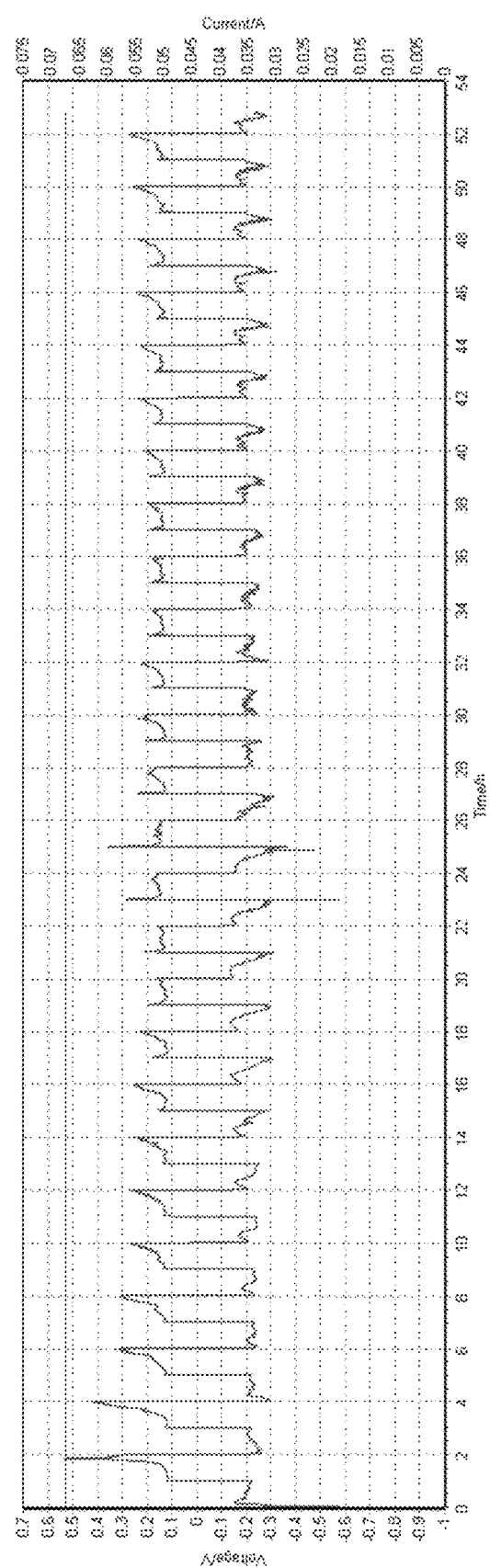

Example 2: A lithium copper cell was constructed (referred to herein as "Ex. 2") and operated similar to Ex. 1, except that Ex. 2 was cycled at 7.5 mA/cm$^2$ with 75% lithium ion usage. FIGS. 9A and 9B show supporting voltage profiles highlighting the difference in overpotential of Comp. Ex. 2 and Ex. 2. The Comp. Ex. 2 cell that did not include the interlayer shorted in 11 cycles within 22 hours, while the Ex. 2 cell that included the hard carbon interlayer continued to operate normally after 25 cycles with minimum over polarization. This indicates that the interlayer smooths or levels the current distribution for fast lithium plating, storing, and preventing the dendrite from projecting through the separators.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "semi-solid" refers to a material that is a mixture of liquid and solid phases, for example, such as a particle suspension, a slurry, a colloidal suspension, an emulsion, a gel, or a micelle.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. An electrochemical cell, comprising:
   a first electrode disposed on a first current collector;
   a second electrode disposed on a second current collector;
   a first separator disposed on the first electrode;
   a second separator disposed on the second electrode;
   an interlayer disposed between the first separator and the second separator, the interlayer configured to prevent the projection of dendrites through at least one of the first separator or the second separator; and
   a controller configured to: monitor a voltage between the first electrode and the interlayer and cause discharge of the electrochemical cell upon detecting a decrease in the monitored voltage by a threshold voltage, the threshold voltage less than a full discharge voltage of the electrochemical cell.

2. The electrochemical cell of claim 1, further comprising:
   a first electrode tab extending from the first current collector; and
   an interlayer tab extending from the interlayer, the interlayer tab extending beyond the first separator and the second separator.

3. The electrochemical cell of claim 1, wherein the interlayer includes an electron-conductive material.

4. The electrochemical cell of claim 1, wherein the interlayer includes a carbonaceous material.

5. The electrochemical cell of claim 4, wherein the carbonaceous material includes at least one of graphite, hard carbon, or carbon black.

6. The electrochemical cell of claim 1, wherein the interlayer includes a lithium-containing electrode material.

7. The electrochemical cell of claim 1, wherein the interlayer includes at least one of LFP, LTO, or NMC.

8. The electrochemical cell of claim 1, wherein the interlayer includes a semi-solid electrode material.

9. The electrochemical cell of claim 1, wherein the interlayer includes a lithium intercalation material.

10. The electrochemical cell of claim 9, wherein the lithium intercalation material includes at least one of Si, Al, Sn, Ag, W or combinations thereof.

11. The electrochemical cell of claim 1, wherein the interlayer includes an electron-conductive powder.

12. The electrochemical cell of claim 1, wherein the interlayer includes a first layer including a first material and a second layer including a second material different from the first material.

13. An electrochemical cell, comprising:
   an anode disposed on an anode current collector;
   a cathode disposed on a cathode current collector;
   a first separator disposed on the anode;
   a second separator disposed on the cathode;
   an interlayer disposed between the anode and the cathode; and
   a controller configured to; measure a voltage between the anode and the interlayer, the controller further configured to cause discharge of the electrochemical cell if the measured voltage between the anode and the interlayer decreases by a value of at least about 0.5 V and less than a full discharge voltage of the electrochemical cell.

14. The electrochemical cell of claim 13, further comprising:
   an electrode tab extending from the anode current collector; and
   an interlayer tab extending from the interlayer, the interlayer tab extending beyond the first separator and the second separator.

15. The electrochemical cell of claim 13, wherein the interlayer includes an electron-conductive material.

16. The electrochemical cell of claim 13, wherein the controller is configured to discharge the electrochemical cell if the measured voltage decreases by a value of at least about 1 V.

17. The electrochemical cell of claim 13, wherein the controller is configured to discharge the electrochemical cell if the measured voltage decreases by a value of at least about 1.5 V.

18. The electrochemical cell of claim 13, wherein the interlayer includes a carbonaceous material.

19. The electrochemical cell of claim 18, wherein the carbonaceous material includes at least one of graphite, hard carbon, or carbon black.

20. The electrochemical cell of claim 13, wherein the interlayer includes a lithium-containing electrode material.

21. The electrochemical cell of claim 20, wherein the interlayer includes at least one of LFP, LTO, or NMC.

22. The electrochemical cell of claim 13, wherein the interlayer includes a semi-solid electrode material.

23. A method of operating an electrochemical cell, the electrochemical cell including an anode disposed on an anode current collector, a cathode disposed on a cathode current collector, a first separator disposed on the anode, a second separator disposed on the cathode, and an interlayer disposed between the first separator and the second separator, the method comprising:

measuring a voltage between the anode and the interlayer; and in response to detecting a soft short circuit event between the anode and the interlayer based on the measured voltage, initiating discharge of the electrochemical cell via an external circuit, the soft short circuit event corresponding to a decrease in voltage between the anode and the interlayer by a value less than a full discharge voltage of the electrochemical cell.

24. The method of claim 23, wherein initiating discharge of the electrochemical cell via the external circuit is in response to the measured voltage decreasing by a value of at least about 1 V.

25. The method of claim 23, wherein initiating discharge of the electrochemical cell via the external circuit is in response to the measured voltage decreasing by a value of at least about 1.5 V.

26. The method of claim 23, wherein measuring the voltage is via connecting a voltage measurement device to an anode tab extending from the anode and an interlayer tab extending from the interlayer.

27. The method of claim 23, wherein the interlayer includes an electron-conductive material.

28. The method of claim 23, wherein the interlayer includes a carbonaceous material.

29. The method of claim 28, wherein the carbonaceous material includes at least one of graphite, hard carbon, or carbon black.

30. The method of claim 23, wherein the interlayer includes a semi-solid electrode material.

* * * * *